United States Patent
Park et al.

(10) Patent No.: US 11,622,097 B2
(45) Date of Patent: Apr. 4, 2023

(54) APPARATUS AND METHOD FOR PROVIDING POINT OF INTEREST (POI) INFORMATION IN 360 VIDEO

(71) Applicant: Samsung Electronics Co., Ltd., Suwon-si (KR)

(72) Inventors: Wonkyu Park, Suwon-si (KR); Minhwa Hong, Suwon-si (KR); Yeojin Kim, Suwon-si (KR); Sanghyun Park, Suwon-si (KR); Hyeonju Lee, Suwon-si (KR); Stephanie Kim Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/763,087

(22) PCT Filed: Dec. 18, 2018

(86) PCT No.: PCT/KR2018/016098
§ 371 (c)(1),
(2) Date: May 11, 2020

(87) PCT Pub. No.: WO2019/124922
PCT Pub. Date: Jun. 27, 2019

(65) Prior Publication Data
US 2020/0280711 A1    Sep. 3, 2020

(30) Foreign Application Priority Data

Dec. 22, 2017 (KR) .................. 10-2017-0177762

(51) Int. Cl.
*H04N 13/167* (2018.01)
*H04N 13/183* (2018.01)
(Continued)

(52) U.S. Cl.
CPC ....... *H04N 13/167* (2018.05); *H04N 5/23238* (2013.01); *H04N 13/183* (2018.05);
(Continued)

(58) Field of Classification Search
CPC .. H04N 13/167; H04N 13/349; H04N 13/183; H04N 13/398; H04N 5/44591;
(Continued)

(56) References Cited

U.S. PATENT DOCUMENTS 8,416,320 B2    4/2013 Jang
8,457,412 B2    6/2013 Ryu
(Continued)

FOREIGN PATENT DOCUMENTS

KR    20110001093 A  *  1/2011  ............. H04W 4/02
KR    10-1062929 B1    9/2011
(Continued)

OTHER PUBLICATIONS

Goncalo Noronha et al., "Sharing and navigating 360? videos and maps in sigh surfers", Oct. 3-5, 2012, XP55283057.
(Continued)

*Primary Examiner* — Thai Q Tran
*Assistant Examiner* — Nienru Yang
(74) *Attorney, Agent, or Firm* — Jefferson IP Law, LLP

(57) ABSTRACT

An electronic device is disclosed. In addition, various embodiments identified through the specification are possible. The electronic device includes a display, a processor, and a memory storing instructions that, when executed by the processor, cause the processor to display, when a video supporting a plurality of orientation regions is played, a first screen corresponding to a first orientation region among the plurality of orientation regions, display a timeline representing a playback time of the video, display thumbnails of screens corresponding to the plurality of orientation regions
(Continued)

at the first time point in response to a first user input pointing a first time point in the timeline, and receive a second user input scrolling the thumbnails.

7 Claims, 25 Drawing Sheets

(51) Int. Cl.

| | | |
|---|---|---|
| H04N 13/349 | (2018.01) | |
| H04N 13/398 | (2018.01) | |
| H04N 5/232 | (2006.01) | |
| H04N 21/431 | (2011.01) | |
| H04N 21/472 | (2011.01) | |
| H04N 21/4728 | (2011.01) | |
| H04N 21/81 | (2011.01) | |
| H04N 21/422 | (2011.01) | |
| H04N 21/47 | (2011.01) | |
| G06F 3/0354 | (2013.01) | |
| G06F 3/0482 | (2013.01) | |
| G06F 3/0485 | (2022.01) | |

(52) U.S. Cl.
CPC ......... *H04N 13/349* (2018.05); *H04N 13/398* (2018.05); *H04N 21/42204* (2013.01); *H04N 21/4312* (2013.01); *H04N 21/4316* (2013.01); *H04N 21/47* (2013.01); *H04N 21/4728* (2013.01); *H04N 21/47217* (2013.01); *H04N 21/816* (2013.01); *G06F 3/03545* (2013.01); *G06F 3/0482* (2013.01); *G06F 3/0485* (2013.01); *H04N 21/42206* (2013.01); *H04N 21/42224* (2013.01)

(58) Field of Classification Search
CPC .......... H04N 5/4403; H04N 21/4312; H04N 21/4728; H04N 21/816; H04N 21/47217; H04N 5/23238; H04N 2005/443; H04N 2005/4432; H04N 21/431; H04N 21/485; H04N 21/4223; H04N 21/41407; H04N 21/42204; H04N 21/47; H04N 13/117; H04N 21/4316; H04N 21/42224; H04N 21/42206; H04N 5/445; H04N 5/44; H04N 5/232; H04N 21/81; H04N 21/472; G06F 3/0485; G06F 3/03545; G06F 3/0482
USPC .......................................................... 348/39
See application file for complete search history.

(56) References Cited

U.S. PATENT DOCUMENTS

| | | |
|---|---|---|
| 8,963,962 B2 | 2/2015 | Ubillos |
| 9,363,220 B2 | 6/2016 | Ubillos et al. |
| 2012/0294539 A1 | 11/2012 | Lim et al. |
| 2014/0199043 A1 | 7/2014 | Guntur et al. |
| 2015/0309310 A1* | 10/2015 | Cho ..................... H04N 21/816 348/158 |
| 2015/0373281 A1* | 12/2015 | White .................. G11B 27/002 348/660 |
| 2017/0026577 A1 | 1/2017 | You et al. |
| 2017/0064374 A1 | 3/2017 | Eim et al. |
| 2017/0139578 A1* | 5/2017 | Dickerson ........... G06F 3/04815 |
| 2017/0322635 A1 | 11/2017 | Yoon et al. |

FOREIGN PATENT DOCUMENTS

| | | |
|---|---|---|
| KR | 10-1082487 B1 | 11/2011 |
| KR | 10-2013-0123629 A | 11/2013 |
| KR | 10-2014-0092211 A | 7/2014 |
| KR | 10-1469544 B1 | 12/2014 |
| KR | 10-2017-0026040 A | 3/2017 |
| KR | 10-1737166 B1 | 5/2017 |
| KR | 10-2017-0094576 A | 8/2017 |

OTHER PUBLICATIONS

Extended European Search Report dated Jun. 8, 2020, issued in European Patent Application No. 18891403.0.
Indian Office Action dated Jun. 24, 2021, issued in Indian Patent Application No. 202017020054.

* cited by examiner

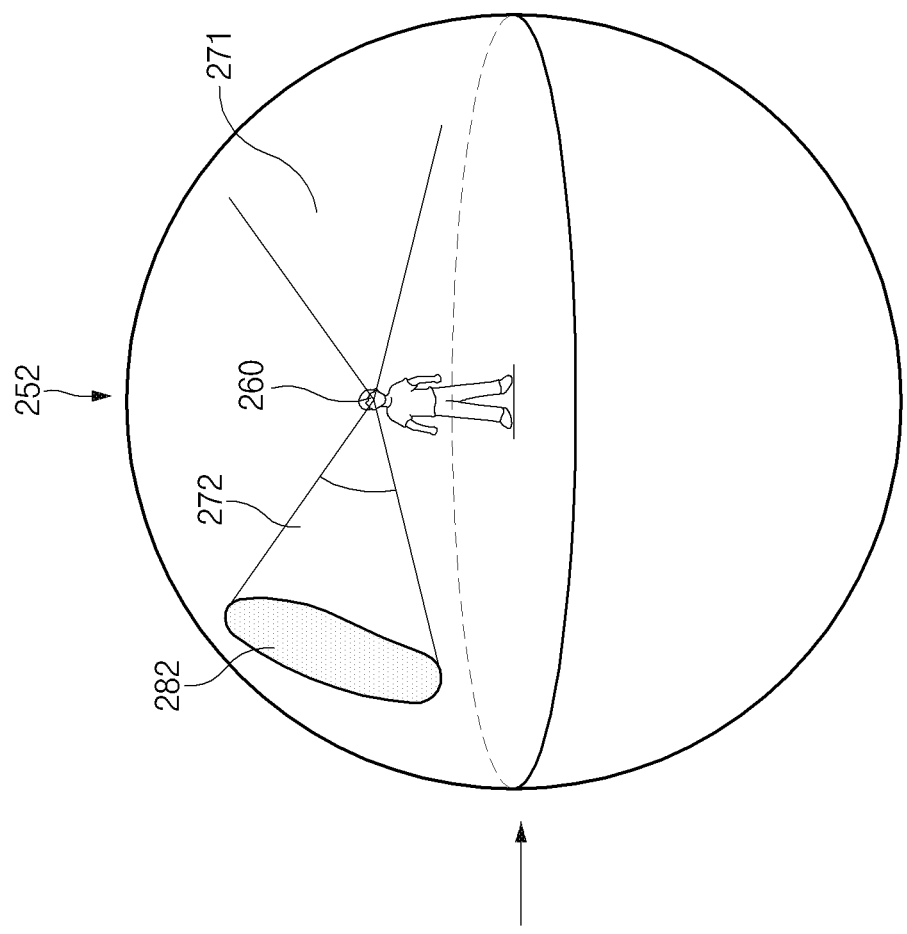
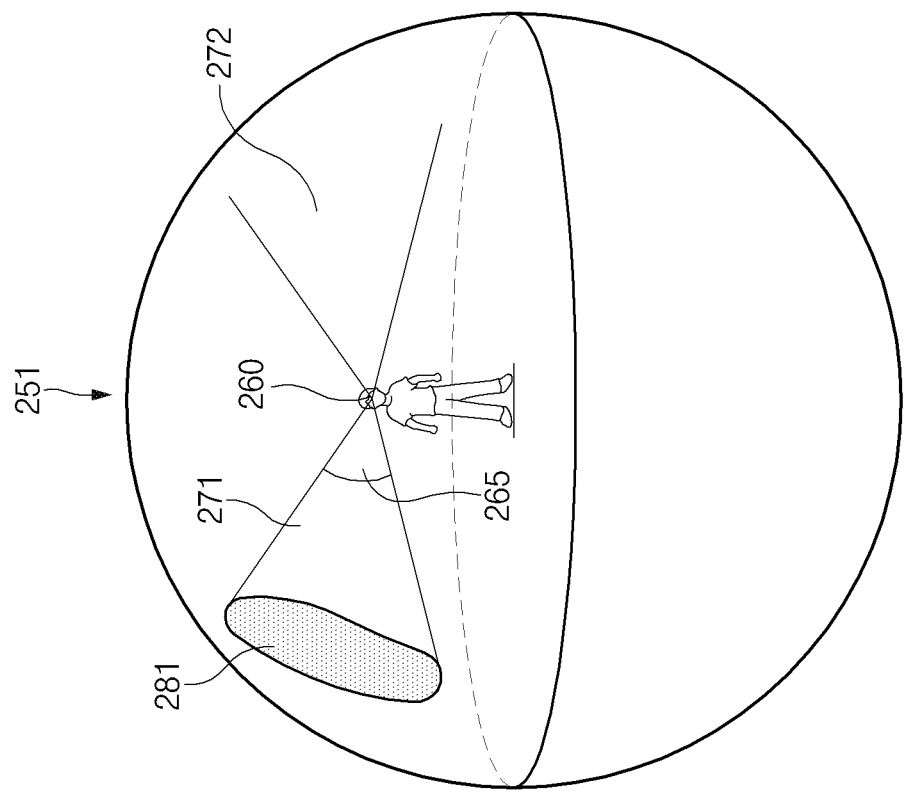
FIG. 2B

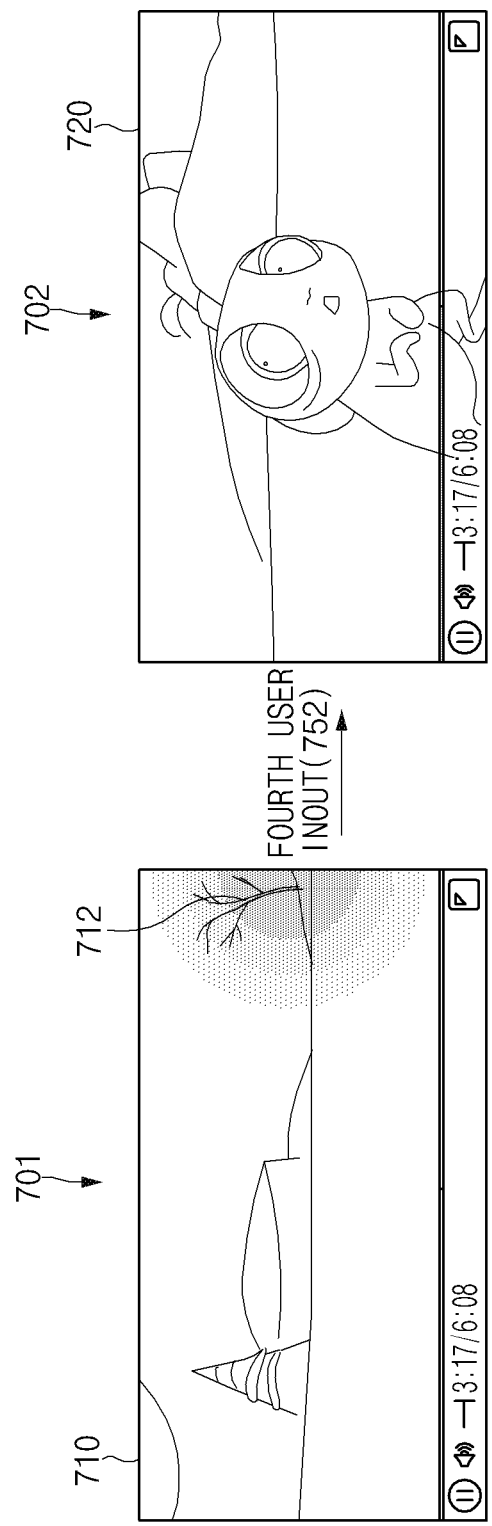

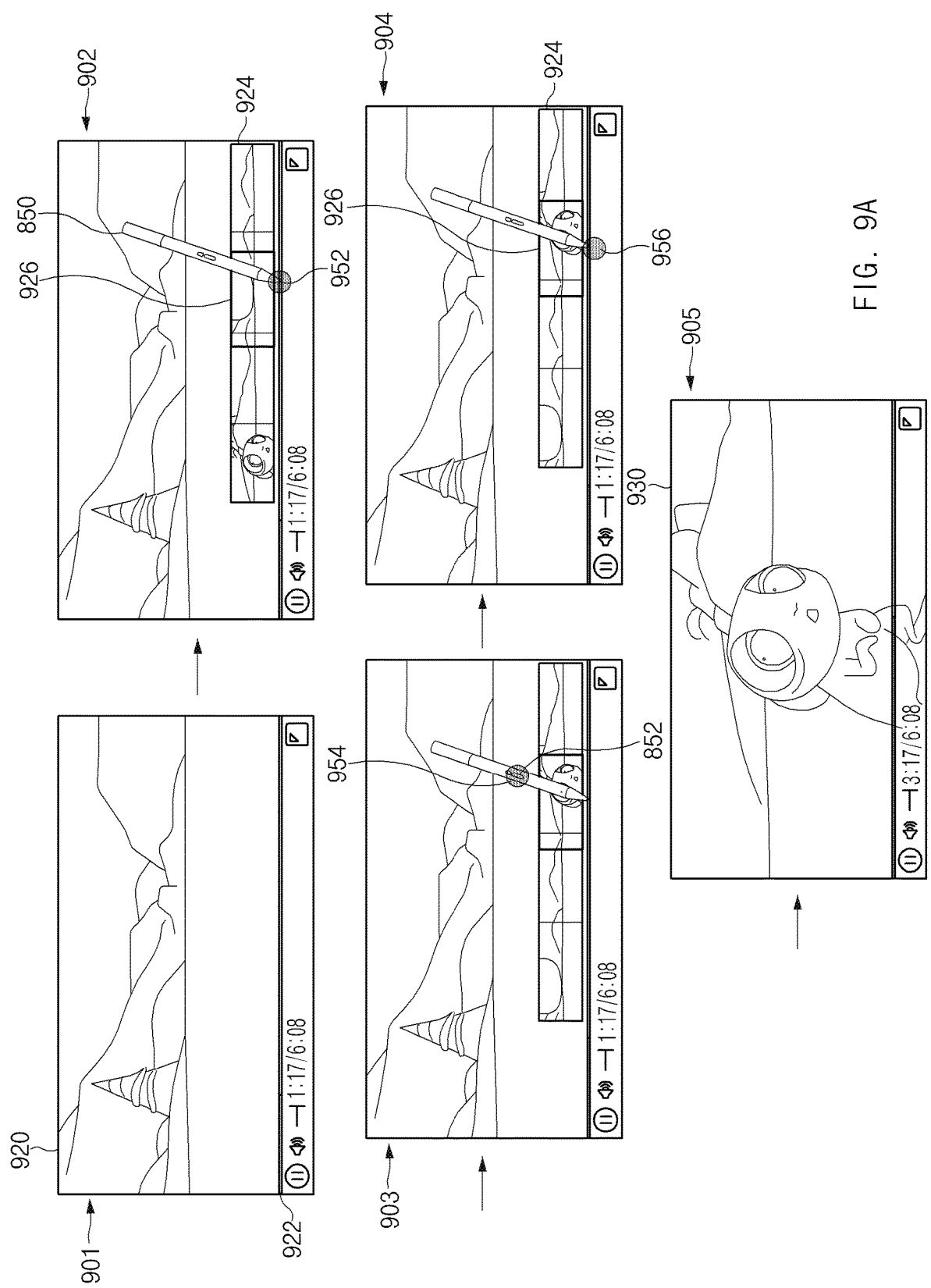

APPARATUS AND METHOD FOR PROVIDING POINT OF INTEREST (POI) INFORMATION IN 360 VIDEO

TECHNICAL FIELD

Embodiments disclosed in the disclosure relate to a device and a method for providing point of interest (POI) information in a 360 video.

BACKGROUND ART

An electronic device (e.g., a smart phone, a computer device, or a virtual reality (VR) device) may play multimedia such as a photo, a video, a music, a game, or a broadcast. The electronic device may play a 360 video that supports a viewing angle of 360 degrees. Through the 360 video, the electronic device may provide an experience in which a user of the electronic device may identify not only an object located in a specific orientation region but also an object located in all orientation regions.

The electronic device may store point of interest (POI) information of interest to the user in the 360 video. The electronic device may inform the user of the electronic device to an important region or a region of interest to the user in a screen corresponding to all of the orientation regions through the POI.

DISCLOSURE

Technical Problem

In the conventional art, while a 360 video supports a viewing angle of 360 degrees, a display size of an electronic device is limited. Therefore, the electronic device is not able to display a screen of a remaining orientation region while a screen of a specific orientation region (or may be referred to as an azimuth) is displayed in the 360 video. A user of the electronic device should provide the electronic device with a user input of moving a screen to identify a screen of another orientation region.

Further, in the conventional art, while a screen of a specific orientation region is displayed, the electronic device is not able to provide POI information included in another orientation region at a specific timeline to the user of the electronic device.

Various embodiments of the disclosure are intended to propose a device and a method for providing information about a screen of another orientation region or information about a POI located in another orientation region without moving a screen in a 360 video.

Technical Solution

An aspect of the disclosure provides an electronic device including a display, a processor electrically connected to the display, and a memory electrically connected to the processor, wherein the memory stores instructions that, when executed by the processor, cause the processor to display, when a video supporting a plurality of orientation regions is played, a first screen corresponding to a first orientation region among the plurality of orientation regions through the display, display a timeline representing a playback time of the video through the display, receive a first user input of pointing a first time point in the timeline, display thumbnails of screens corresponding to the plurality of orientation regions through the display at the first time point in response to the first user input, and receive a second user input scrolling the thumbnails.

Another aspect of the disclosure provides a method of an electronic device including displaying, when a video supporting a plurality of orientation regions is played, a first screen corresponding to a first orientation region among the plurality of orientation regions through a display, displaying a timeline representing a playback time of the video through the display, receiving a first user input pointing a first time point in the timeline, displaying thumbnails of screens corresponding to the plurality of orientation regions through the display at the first time point in response to the first user input, receiving a second user input scrolling the thumbnails, receiving a third user input of selecting a thumbnail of a second screen corresponding to a second orientation region among the thumbnails, and displaying the second screen at the first time point through the display in response to the third user input.

Another aspect of the disclosure provides an electronic device including a display, a processor electrically connected to the display, and a memory electrically connected to the processor, wherein the memory stores instructions that, when executed by the processor, cause the processor to display, when a video supporting a plurality of orientation regions is played, a first screen corresponding to a first orientation region among the plurality of orientation regions through the display, display a user interface representing at least one POI while the first screen is displayed through the display, wherein the UI includes a playback time point and an orientation region of each of the at least one POI, receive a first user input scrolling the UI, receive a second user input of selecting a first POI among the at least one POI, and display a screen containing the first POI through the display in response to the second user input.

Advantageous Effects

According to the embodiments disclosed in the disclosure, the electronic device may provide the user with the information about the screen of another orientation region at the specific timeline without moving the screen.

According to the embodiments disclosed in the disclosure, the electronic device may provide the user with the information about the POI without moving the screen.

In addition, various effects that may be directly or indirectly identified through the disclosure may be provided.

DESCRIPTION OF DRAWINGS

FIG. 2B illustrates an operation of playing a 360 video according to various embodiments.

FIG. 7A illustrates an operation representing a direction of a screen containing a POI according to various embodiments.

FIG. 9A illustrates an operation of displaying thumbnails of screens corresponding to a plurality of orientation regions in a panorama shape in an electronic device including a touch circuit according to various embodiments.

In the description of the drawings, the same or similar reference numerals may be used for the same or similar components.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
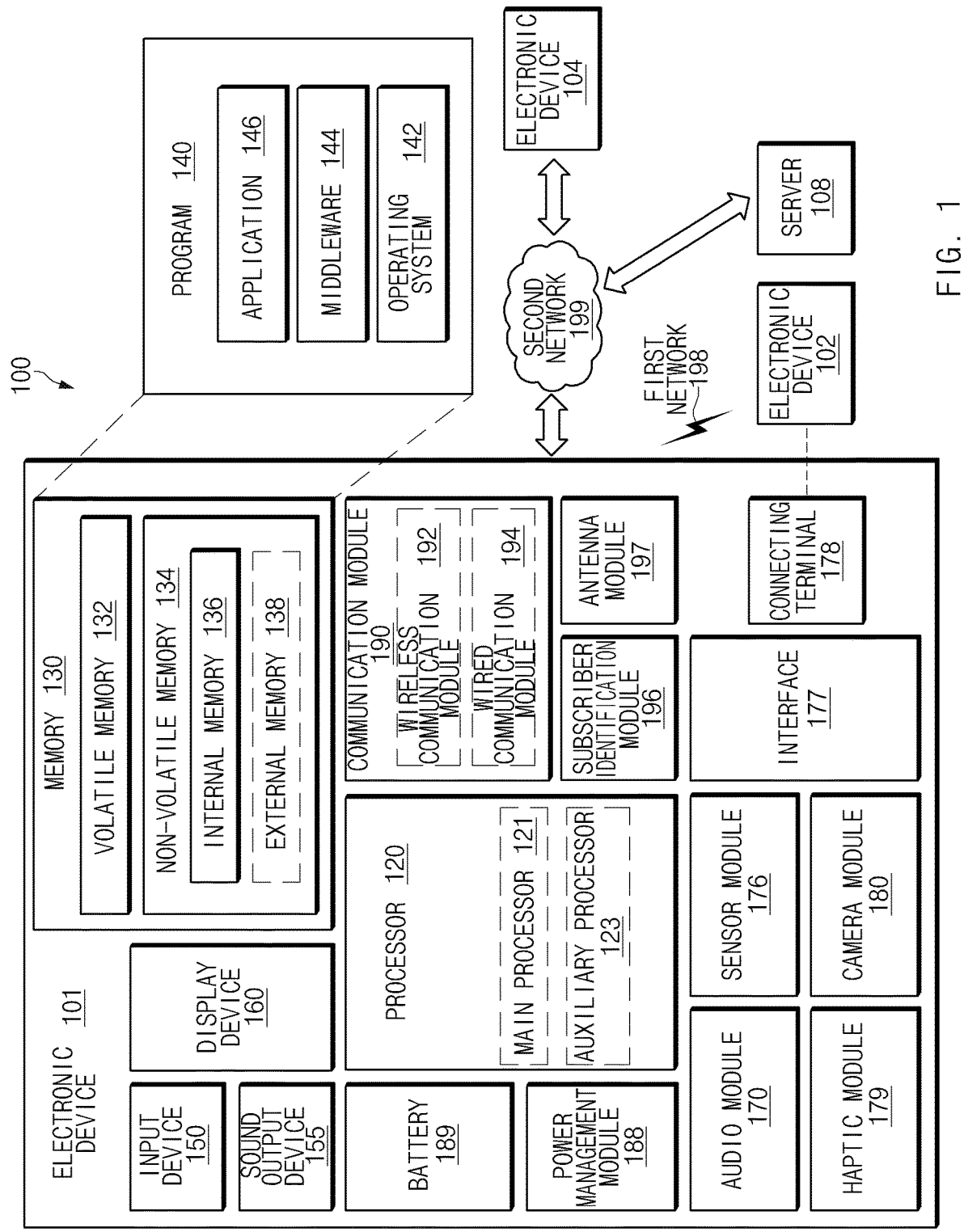
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102) (e.g., speaker of headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In various embodiments to be described below, the electronic device 101 may include at least one of a portable communication device (e.g. a smartphone), a computer device, a portable multimedia device, a portable medical device, a camera, a wearable device, a headset or a form factor supporting a virtual reality (VR) function, and home appliances.

Figure 2A:
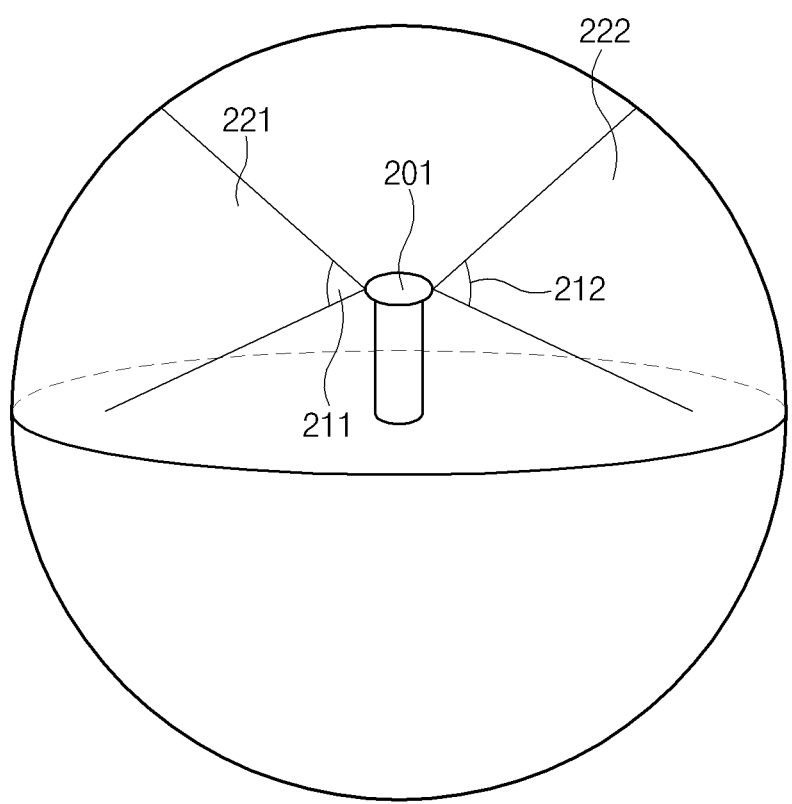
FIG. 2A illustrates an operation of shooting a 360 video according to various embodiments.

FIG. 2A illustrates an operation of shooting a 360 video according to various embodiments.

Referring to FIG. 2A, an electronic device 201 may be the electronic device 101 in FIG. 1 or another external electronic device (e.g., the electronic device 102 in FIG. 1). The electronic device 201 may include a plurality of camera sensors. The plurality of camera sensors included in the electronic device 201 may support the same field of view or different field of views. For example, a first field of view 211 and a second field of view 212 may be the same or different from each other. The electronic device 201 may capture images of a plurality of orientation regions using the plurality of camera sensors. For example, the electronic device 201 may capture an image of a first orientation region 221 through a camera sensor supporting the first field of view 211, and may capture an image of a second orientation region 222 through another camera sensor supporting the second field of view 212. For convenience of description, FIG. 2A illustrates the electronic device 201 that captures the images through the two camera sensors, but the number of camera sensors and fields of view supported by the camera sensors are not limited to specific numbers. The electronic device 201 may obtain an image of all orientation regions (e.g., 180 degrees or 360 degrees) by capturing the images of the plurality of orientation regions and processing the captured plurality of images.

FIG. 2B illustrates an operation of playing a 360 video according to various embodiments.

Referring to reference numeral 251 in FIG. 2B, when a 360 video (that is, a video supporting the plurality of orientation regions) is played, the electronic device 101 (e.g., the electronic device 101 in FIG. 1) may provide the image of all the orientation regions to a user 260 using the electronic device 101. Because a size of a display (e.g., the display device 160 in FIG. 1) of the electronic device 101 is limited, a viewing angle 265 of a screen displayed through the display of the electronic device 101 may be limited. For example, the user 260 may only identify a first object 281 located in a first orientation region 271 by viewing only a screen corresponding to the first orientation region 271. While the screen corresponding to the first orientation region 271 is displayed, the user 260 is not able to identify an object located in another orientation region.

Referring to reference numeral 252 in FIG. 2B, the electronic device 101 may display a screen corresponding to a second orientation region 272 in response to receiving a user input of moving the screen from the user 260. When the orientation region of the displayed screen moves to the second orientation region 272, the user 260 may identify a second object 282 located in the second orientation region 272. While the screen corresponding to the second orientation region 272 is displayed, the user 260 is not able to identify an object (e.g., the first object 281) located in another orientation region.

Figure 3:
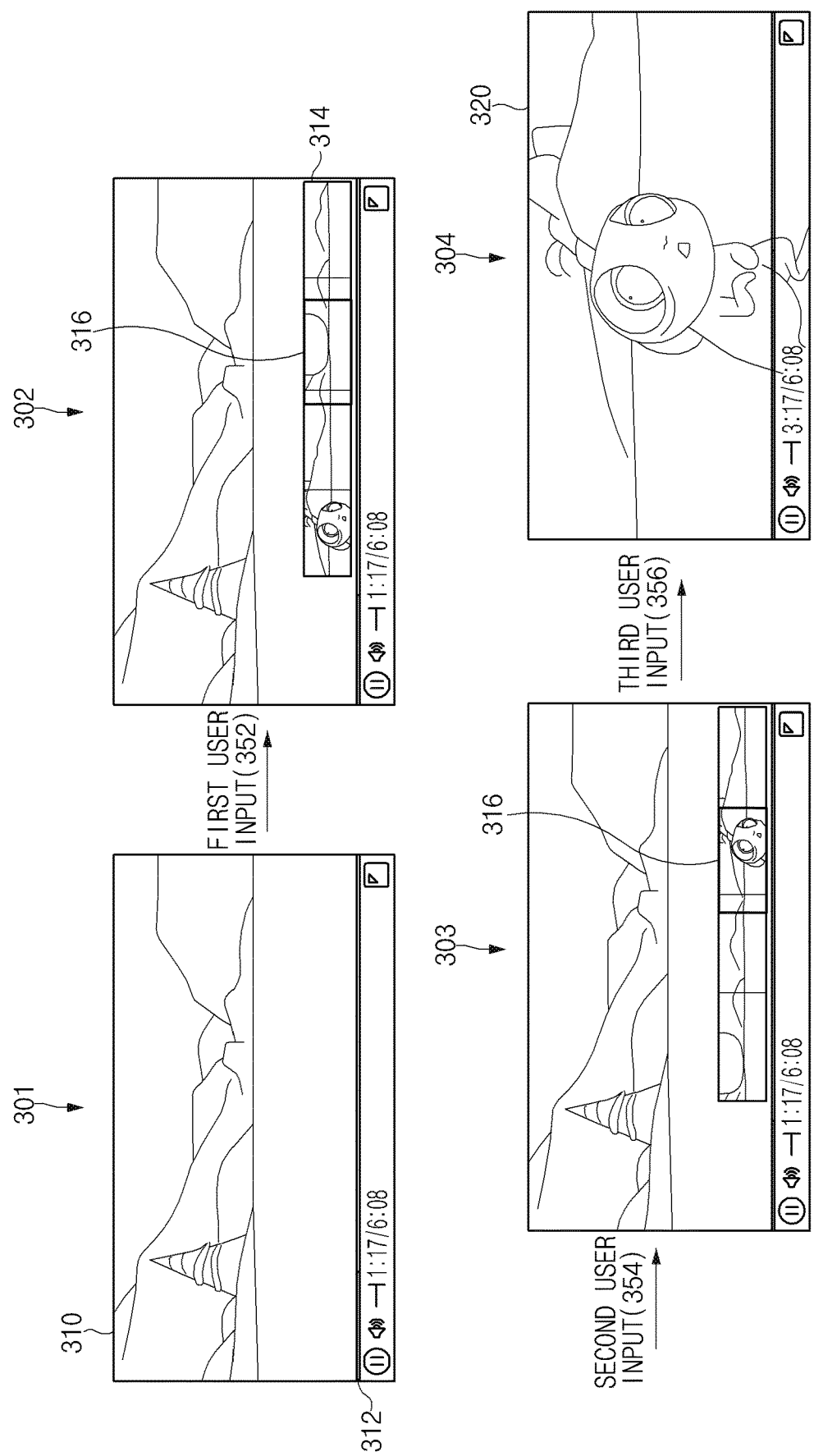
FIG. 3 illustrates an operation of displaying thumbnails of screens corresponding to a plurality of orientation regions according to various embodiments.

FIG. 3 illustrates an operation of displaying thumbnails of screens corresponding to a plurality of orientation regions according to various embodiments. Screens illustrated in reference numerals in FIG. 3 may be displayed by the display of the electronic device 101.

Referring to reference numeral 301 in FIG. 3, when the video supporting the plurality of orientation regions is played on the electronic device 101, the electronic device 101 may display a first screen 310 corresponding to a first orientation region (e.g., the first orientation region 271 in FIG. 2B) among the plurality of orientation regions. While the video is being played in the first orientation region, the electronic device 101 may display a timeline 312 indicating a playback time of the video through the display. The timeline 312 may be referred to as a seek bar.

Referring to reference numeral 302 in FIG. 3, in response to a first user input 352 of pointing to a specific time point (e.g., a 3 minutes 17 seconds time point of the video) in the timeline 312, the electronic device 101 may display thumbnails 314 of screens corresponding to the plurality of orientation regions at the pointed time point through the display (e.g., the display device 160 in FIG. 1). The first user input 352 may include, for example, an user input of pointing a specific region in the timeline 312 by a mouse cursor, a pointer of a VR headset (e.g., a touchpad or a pointer based on eye tracking of a head mounted display (HMD)), or a pointer of a controller. In another example, the first user input 352 may include a hovering input of an electronic pen electrically connected to the electronic device 101. In another example, the first user input 352 may include an air gesture or a finger recognition operation of a body part (e.g., a finger) of the user of the electronic device 101.

According to an embodiment, the thumbnail may be referred to as a preview screen. A size, a shape, and a position of the thumbnails 314 may not be limited to the example shown in FIG. 3. For example, although FIG. 3 illustrates an example of the thumbnails 314 showing the screens corresponding to the plurality of orientation regions in a panoramic shape, the shape of the thumbnails 314 may include a square, a sphere, a cylinder, and the like. In another example, the thumbnails 314 may be displayed at a left side, a right side, or a top of the first screen 310, as well as above the timeline 312. In another example, the electronic device 101 may display the thumbnails 314 in a transparent shape while the video is being played. In another example, the electronic device 101 may display a remaining screen region in which the thumbnails 314 are not displayed on the first screen 310 in a transparent shape while the thumbnails 314 are displayed.

According to an embodiment, the electronic device 101 may display a thumbnail indicator 316 for indicating a thumbnail of a screen corresponding to a specific orientation region in the thumbnails 314. FIG. 3 shows the thumbnail indicator 316 indicating the specific screen in a border shape, but a shape of the thumbnail indicator 316 is not limited to the border shape. For example, the electronic device 101 may display the thumbnails 314 in the transparent shape, and display the screen indicated by the thumbnail indicator 316 in a non-transparent shape.

Referring to reference numeral 303 in FIG. 3, in response to a second user input 354 of scrolling the thumbnails 314, the electronic device 101 may scroll the thumbnails 314. The second user input 354 may include, for example, an operation of moving a mouse wheel or a joystick of a VR controller in a left and right direction or in a up and down direction. In another example, the second user input 354 may include an operation of swiping the touchpad of the VR headset or the controller in the up and down direction or in the left and right direction. In another example, the second user input 354 may include a button input of the electronic pen. In another example, the second user input 354 may include an operation (e.g., the hovering input) of recognizing the user's body part for a predetermined threshold time or more.

According to an embodiment, in response to the second user input 354, the electronic device 101 may control the thumbnails 314 to move in a left direction while the thumbnail indicator 316 is fixed. When the video supports an orientation region of 360 degrees, the electronic device 101 may control the thumbnails 314 to rotate in the left direction. The electronic device 101 may control the thumbnails 314 such that the thumbnail indicator 316 indicates a thumbnail of a second screen 320 corresponding to a second orientation region (e.g., the second orientation region 272 in FIG. 2B) among thumbnails of the screens corresponding to the plurality of orientation region.

Referring to reference numeral 304 in FIG. 3, in response to a third user input 356 of selecting the thumbnail of the second screen 320, the electronic device 101 may display the second screen 320 at the pointed time point (that is, the 3 minutes 17 seconds time point of the video) through the display. The third user input 356 may include, for example, an operation of clicking a button of the mouse or a button of the VR controller. In another example, the third user input 356 may include an operation of touching a touch pad of the VR controller. In another example, the third user input 356 may include an operation of touching the display through the electronic pen. In another example, the third user input 356 may include an operation of touching a touch pad of the VR headset, an operation of selecting the thumbnail of the second screen 320 based on the eye tracking, or an operation of touching the display of the electronic device 101 using the body part of the user.

Figure 4:
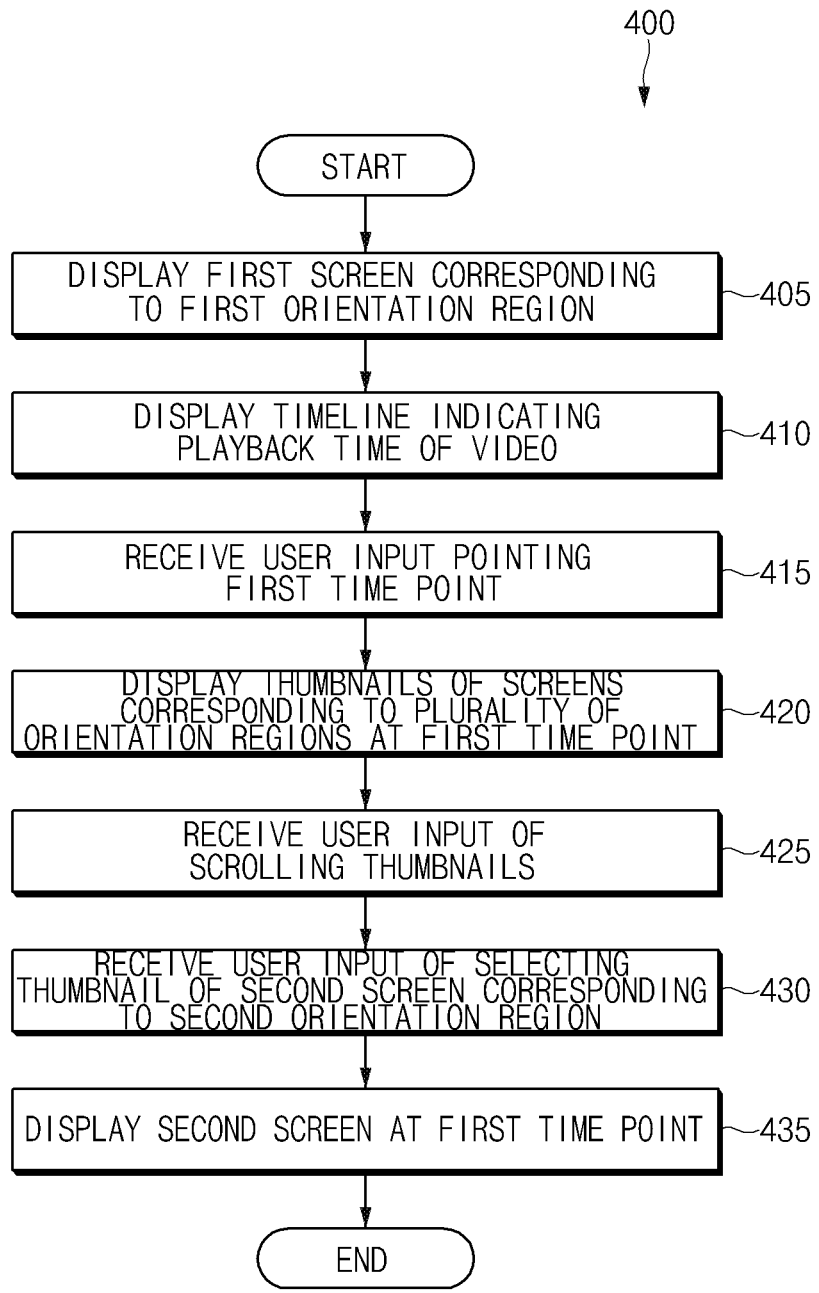
FIG. 4 illustrates an operation flowchart of an electronic device displaying thumbnails of screens corresponding to a plurality of orientation regions according to various embodiments.

FIG. 4 illustrates an operation flowchart of an electronic device displaying thumbnails of screens corresponding to a plurality of orientation regions according to various embodiments. Operations to be described below may be implemented by the electronic device 101. In addition, when instructions included in the memory 130 are executed by the processor 120, the instructions may cause the processor 120 to implement operations to be described below.

Referring to FIG. 4, in operation 405 of a method 400, the processor 120 may display the first screen 310 corresponding to the first orientation region (e.g., the first orientation region 271 in FIG. 2) among the plurality of orientation regions through the display. In operation 410, the processor 120 may display the timeline 312 indicating the playback time of the video. An order of operations 405 to 410 is not limited to the example shown in FIG. 3, and the processor 120 may simultaneously display the first screen 310 and the timeline 312.

In operation 415, the processor 120 may receive a user input (e.g., the first user input 352 in FIG. 3) of pointing a first time point in the timeline 312. For example, when the display of the electronic device 101 includes a touch circuit, and when an input device (e.g., the input device 150 in FIG. 1) of the electronic device 101 includes the electronic pen, the user input of pointing the first time point may include the hovering input of the electronic pen. In another example, the user input of pointing the first time point may include the air gesture or the finger recognition gesture of the user's body part. In another example, when the electronic device 101 includes the VR headset, the user input of pointing the first time point may use the pointer of the VR controller, the touch pad of the VR headset, or the pointer based on the eye tracking. In another example, when the electronic device 101 includes the computing device, the user input of pointing the first time point may include an input of moving the mouse cursor to the first time point.

In operation 420, in response to the user input of pointing the first time point, the processor 120 may display the thumbnails 314 of the screens corresponding to the plurality of orientation regions (that is, all of the orientation regions) at the first time point while the first screen 310 is displayed.

In operation 425, the processor 120 may receive the user input of scrolling the thumbnails 314. For example, when the input device of the electronic device 101 includes the electronic pen, the user input of scrolling the thumbnails may include the button input of the electronic pen. In another example, the user input of scrolling the thumbnails may include a hovering input using the user's finger. In another example, the user input of scrolling the thumbnails may include the operation of swiping the touch pad of the VR controller or the VR headset. In another example, the user input of scrolling the thumbnails may include the operation of scrolling the mouse wheel.

In operation 430, the processor 120 may receive the user input of selecting the thumbnail of the second screen 320 corresponding to the second orientation region (e.g., the second orientation region 272 in FIG. 2B). When the input device of the electronic device 101 includes the electronic pen, the user input of selecting the thumbnail of the second screen 320 may include the operation of touching the display through the electronic pen. In another example, the user input of selecting the thumbnail of the second screen 320 may include the operation of clicking the button of the mouse or the button of the VR controller. In another example, the user input of selecting the thumbnail of the second screen 320 may include the operation of touching the touchpad of the VR controller or the VR headset. In another example, the user input of selecting the thumbnail of the second screen 320 may include the operation of touching the display through the user's body part.

In operation 435, the processor 120 may display the second screen 320 at the first time point. Through an interaction between the electronic device 101 and the user illustrated in FIG. 4, the user of the electronic device 101 may identify a screen corresponding to another orientation region without moving the screen using the scrolling operation.

Figure 5:
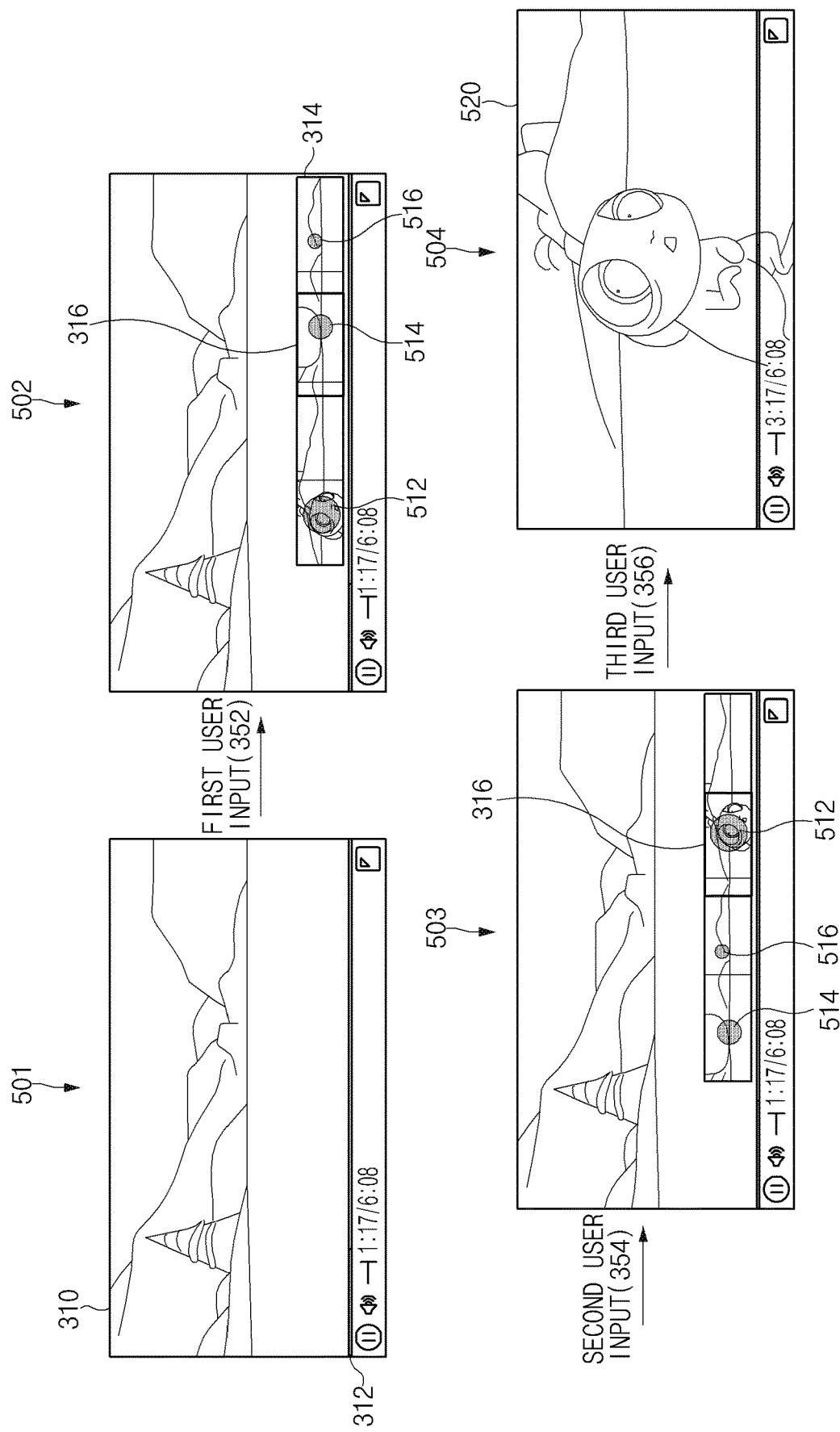
FIG. 5 illustrates an operation of displaying thumbnails of screens corresponding to a plurality of orientation regions in a 360 video containing a point of interest (POI) according to various embodiments.

FIG. 5 illustrates an operation of displaying thumbnails of screens corresponding to a plurality of orientation regions in a 360 video containing a point of interest (POI) according to various embodiments.

Referring to reference numeral 501 in FIG. 5, while the first screen 310 corresponding to the first orientation region is displayed, the electronic device 101 may receive the first user input 352 of pointing the specific time point in the timeline 312. Referring to reference numeral 502, in response to the first user input 352, the electronic device 101 may display the thumbnails 314 at the pointed time point. The electronic device 101 may display at least one POI in the thumbnails 314. For example, the thumbnails 314 may contain a POI 512, a POI 514, and a POI 516.

Referring to reference numeral 503 in FIG. 5, in response to the second user input 354 of scrolling the thumbnails 314, the electronic device 101 may scroll the thumbnails 314. The electronic device 101 may control each POI contained in the thumbnails 314 to be scrolled together with the thumbnails 314. The electronic device 101 may control the thumbnails 314 such that the thumbnail indicator 316 indicates a thumbnail of a second screen 520 (e.g., the second screen 320 in FIG. 3) containing the POI 512 by the scrolling operation.

Referring to reference numeral 504 in FIG. 5, in response to the third user input 356 of selecting the screen containing the POI 512, the electronic device 101 may display the second screen 520 containing the POI at the pointed time point. According to an embodiment, the electronic device 101 may apply at least one effect to the second screen 520 containing the POI. For example, the electronic device 101 may enlarge the second screen 520 than a screen that does not contain the POI and display the enlarged second screen 520. In another example, the electronic device 101 may apply a slow motion effect to the second screen 520.

Figure 6:
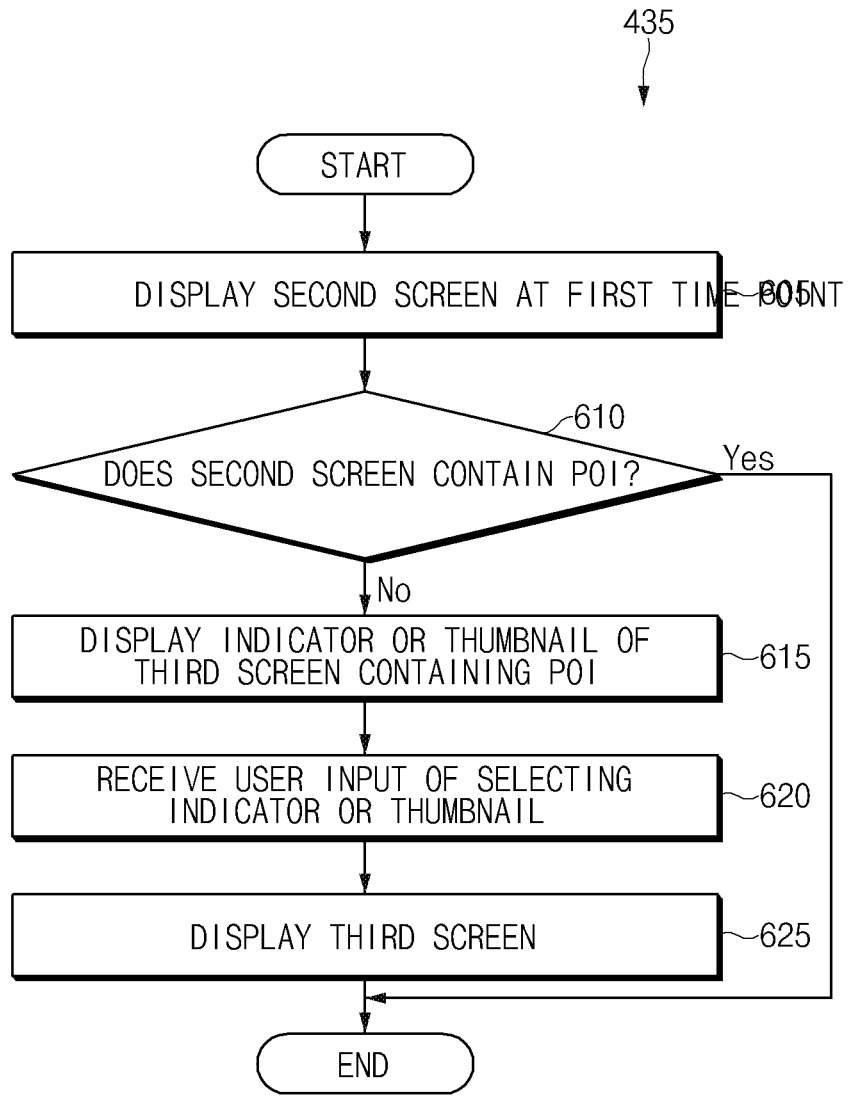
FIG. 6 illustrates an operation flowchart of an electronic device that determines whether a selected screen contains a POI according to various embodiments.

FIG. 6 illustrates an operation flowchart of an electronic device that determines whether a selected screen contains a POI according to various embodiments. The processor 120 (or the electronic device 101) may implement operations in FIG. 6 by more specifically limiting operation 435 in FIG. 4.

Referring to FIG. 6, in operation 605, the processor 120 may display a second screen at the first time point in response to a user input of selecting the second screen. In operation 610, the processor 120 may determine whether the second screen contains the POI. When the second screen contains the POI (that is, when the second screen is the second screen 520 in FIG. 5), the processor 120 may terminate an algorithm. When the second screen does not contain the POI (that is, when the second screen is the second screen 320 in FIG. 3), the processor 120 may proceed to operation 615.

In operation 615, the processor 120 may display an indicator indicating a third screen or a thumbnail of the third screen. The third screen may mean a screen containing the POI. The third screen may correspond to an orientation region different from that of the second screen. In operation 620, the processor 120 may receive a user input of selecting the indicator indicating the third screen or the thumbnail of the third screen.

In operation 625, the electronic device 101 may display the third screen. Through the above-described method, when the user of the electronic device 101 selects the screen that does not contain the POI, the electronic device 101 may guide the screen that contains the POI.

FIG. 7A illustrates an operation representing a direction of a screen containing a POI according to various embodiments.

Referring to reference numeral 701 in FIG. 7A, the electronic device 101 may display a second screen 710 that does not contain the POI through the display. The electronic device 101 may display an indicator 712 indicating a direction of a third screen 720 containing the POI within the second screen 710. For example, when an orientation region of the third screen 720 is located to the right of the orientation region of the second screen 710, the electronic device 101 may display the indicator 712 on a right side of the second screen 710. According to an embodiment, when there are the plurality of third screens 720 containing the POI, the electronic device 101 may display a plurality of indicators, or only an indicator of a screen located in an orientation region closest to the orientation region of the second screen 710.

Referring to reference numeral 702 of FIG. 7A, in response to a fourth user input 752 of selecting the indicator 712 or moving the screen in a direction of the indicator 712, the electronic device 101 may display the third screen 720. The electronic device 101 may apply an effect (e.g., the enlargement or the slow motion) for emphasizing the third screen 720.

Figure 7B:
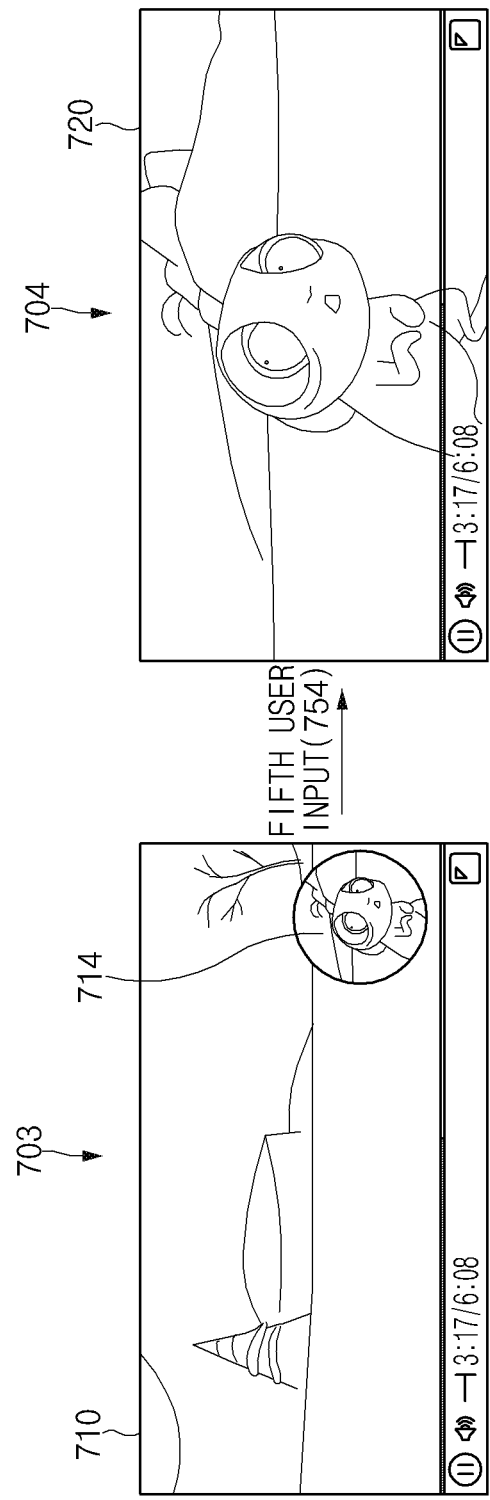
FIG. 7B illustrates an operation of displaying a thumbnail of a screen containing a POI according to various embodiments.

FIG. 7B illustrates an operation of displaying a thumbnail of a screen containing a POI according to various embodiments.

Referring to reference numeral 703 in FIG. 7B, the electronic device 101 may display the second screen 710 that does not contain the POI through the display. The electronic device 101 may display a thumbnail 714 of the third screen 720 containing the POI within the second screen 710. According to an embodiment, a location where the thumbnail 714 is displayed may be a preset location (e.g., right bottom) or may be based on a direction of the third screen 720. According to an embodiment, when there are the plurality of third screens 720 containing the POI, the electronic device 101 may display a plurality of thumbnails, or only a thumbnail of the screen located in the orientation region closest to the orientation region of the second screen 710.

Referring to reference numeral 704 in FIG. 7B, in response to a fifth user input 754 of selecting the thumbnail 714, the electronic device 101 may display the third screen 720. The electronic device 101 may apply the effect (e.g., the enlargement or the slow motion) for emphasizing the third screen 720.

Figure 8:
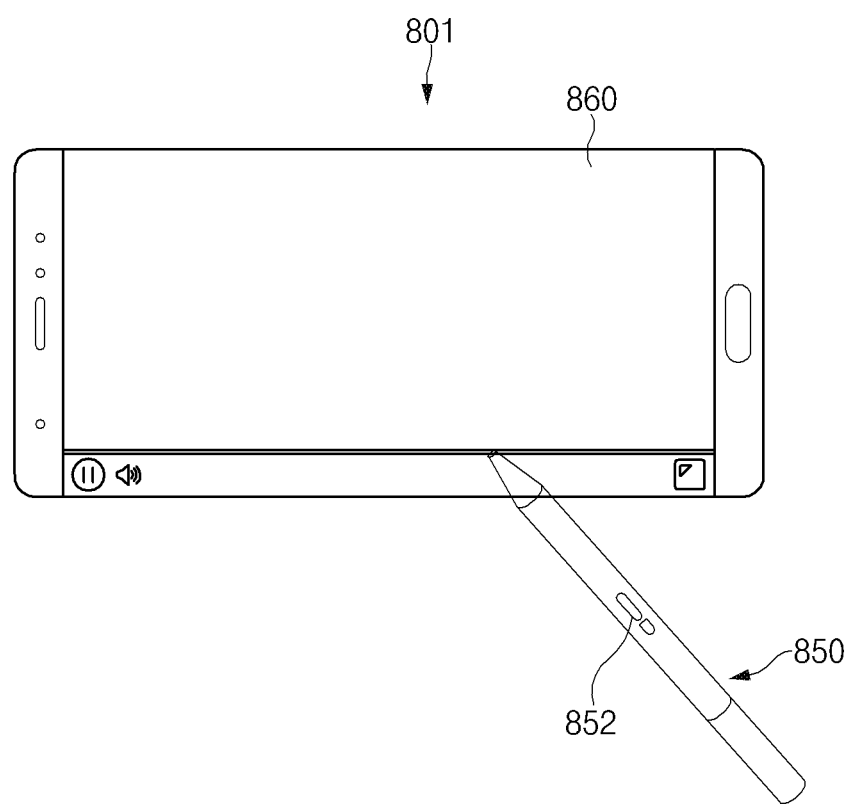
FIG. 8 illustrates an electronic device including a touch circuit according to various embodiments.

FIG. 8 illustrates an electronic device including a touch circuit according to various embodiments.

Referring to FIG. 8, an electronic device 801 (e.g., the electronic device 101 in FIG. 1) may include a display 860 (e.g., the display device 160 in FIG. 1). The display 860 may include a touch circuit that senses a touch input, a hovering input, or a pressure sensor input. The electronic device 801 may be electrically connected to an electronic pen 850. The electronic device 801 may receive various user inputs from the electronic pen 850. For example, the electronic device 801 may receive an input (hereinafter, referred to as a button input) of pressing a button 852 included in the electronic pen 850 by the user. In another example, the electronic device 801 may receive a hovering input, a tap input (which may be referred to as a touch input), a press input, a pressure touch input, a panning input, a swipe input, a flick input, a drag input, a rotation input of the electronic pen 850, or a combination thereof.

Figure 9B:
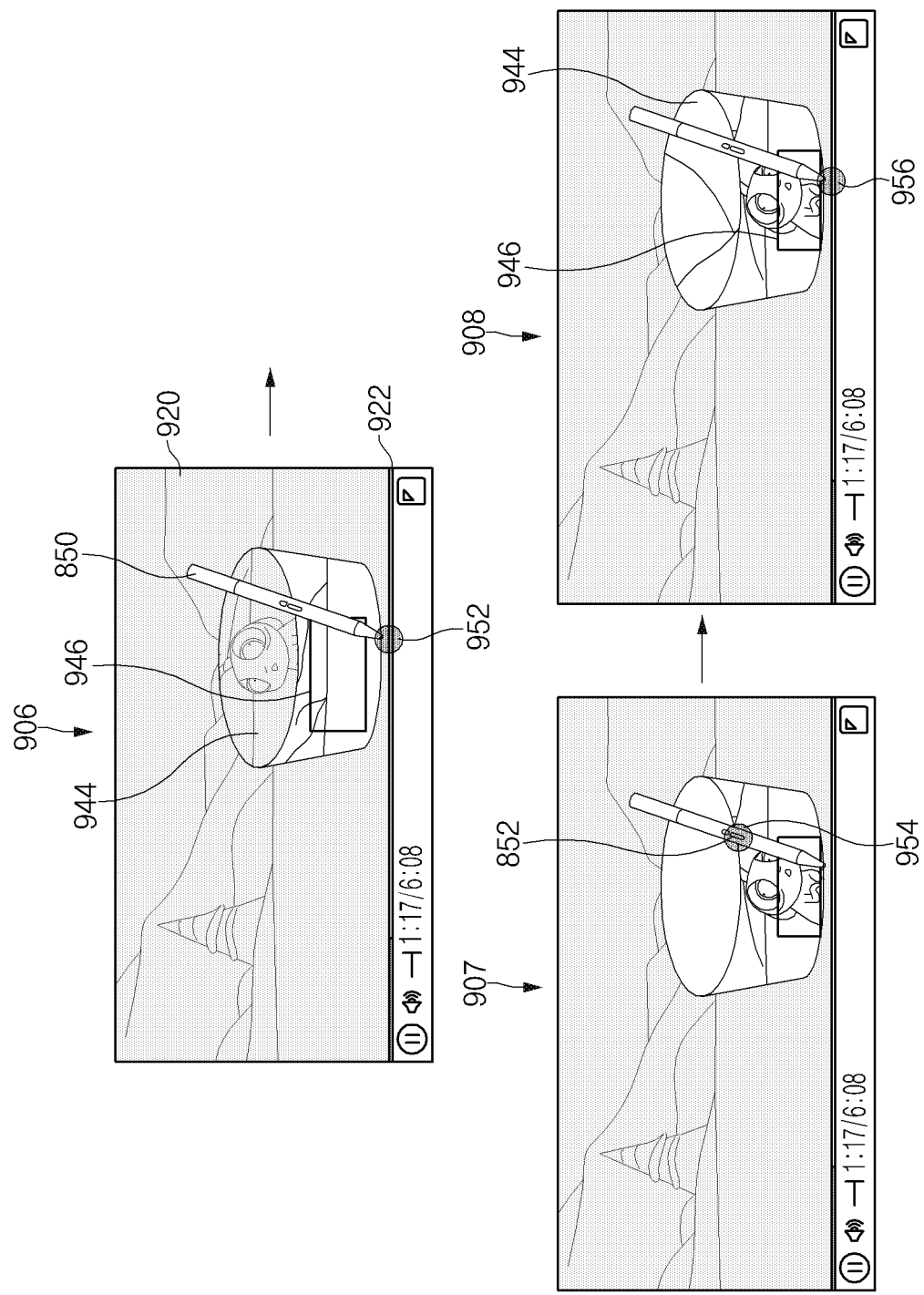
FIG. 9B illustrates an operation of displaying thumbnails of screens corresponding to a plurality of orientation regions in a cylindrical shape in an electronic device including a touch circuit according to various embodiments.
Figure 9C:
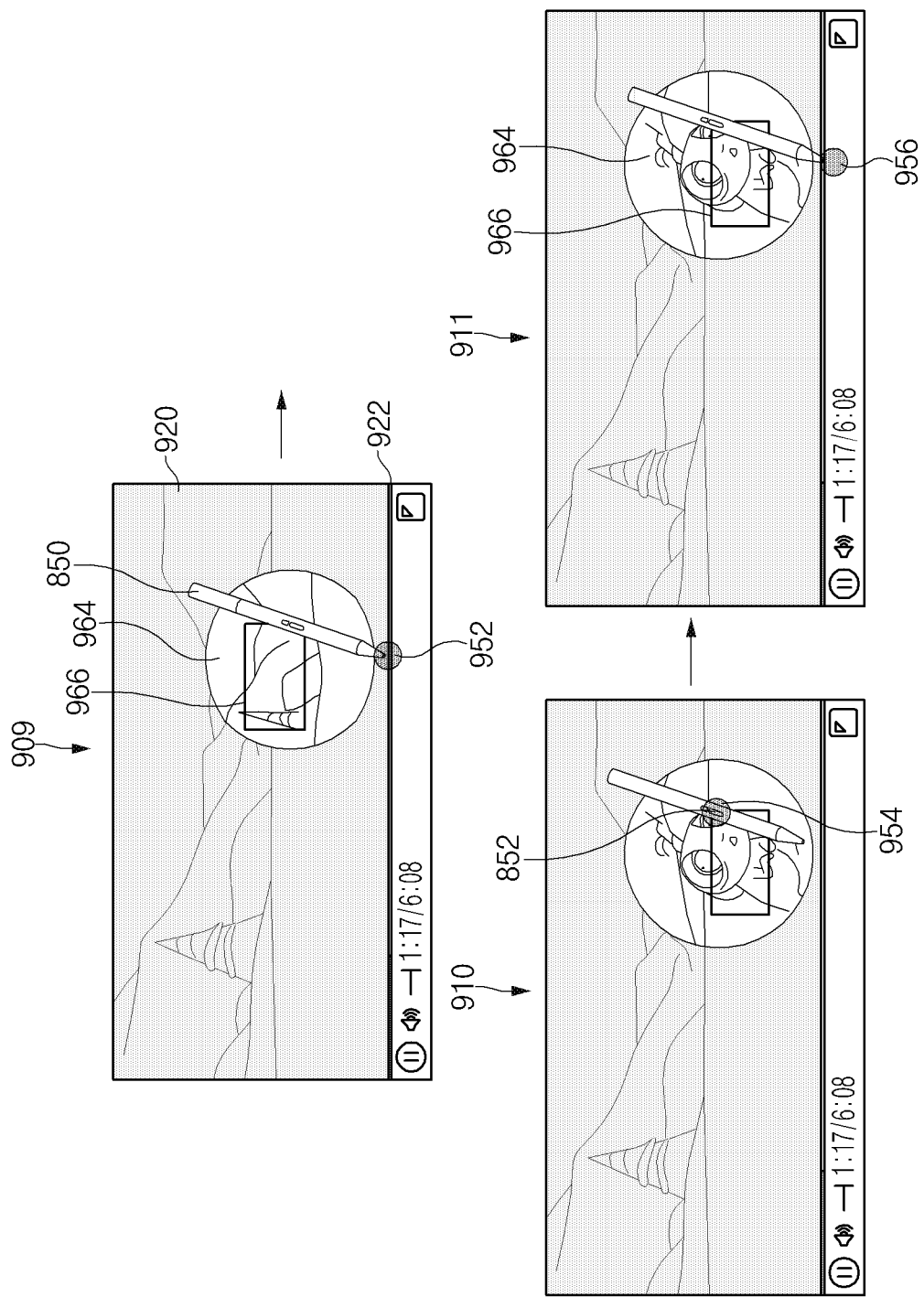
FIG. 9C illustrates an operation of displaying thumbnails of screens corresponding to a plurality of orientation regions in a spherical shape in an electronic device including a touch circuit according to various embodiments.

FIGS. 9A to 9C illustrate operations of displaying thumbnails of screens corresponding to a plurality of orientation regions in an electronic device including a touch circuit according to various embodiments. Each screen illustrated in each reference numeral in FIGS. 9A to 9C may be displayed by the display 860 of the electronic device 801. Embodiments to be described below illustrate an example of a video containing at least one POI, but a similar principle may be applied to an example of moving to a screen of a specific orientation region in the video that does not contain the POI.

FIG. 9A illustrates an operation of displaying thumbnails of screens corresponding to a plurality of orientation regions in a panorama shape in an electronic device including a touch circuit according to various embodiments. Referring to reference numeral 901 in FIG. 9A, when a video that supports a plurality of orientation regions is played, the electronic device 801 may display a first screen 920 corresponding to a first orientation region (e.g., the first orientation region 271 in FIG. 2B). While the video is being played in the first orientation region, the electronic device 101 may display a timeline 922 indicating a playback time of the video.

Referring to reference numeral 902 in FIG. 9A, the electronic device 801 may receive a first user input 952 of hovering the electronic pen 850 at a specific time point (that is, a 3 minutes 17 seconds time point of the video). In response to the first user input 952, the electronic device 801 displays thumbnails 924 (e.g., the thumbnails 314 in FIG. 3) of screens corresponding to a plurality of orientation regions at the hovered time point through the display 860. The thumbnails 924 may be in the panoramic shape. According to an embodiment, the electronic device 801 may display the thumbnails 924 in the transparent shape while the first screen 920 is displayed. According to another embodiment, the electronic device 801 may display the thumbnails 924 in the non-transparent shape and the first screen 920 in the transparent shape. According to an embodiment, the electronic device 801 may display a thumbnail indicator 926 (e.g., the thumbnail indicator 316 in FIG. 3) for indicating a thumbnail of a screen corresponding to a specific orientation region within the thumbnails 924.

Referring to reference numeral 903 in FIG. 9A, the electronic device 801 may receive a second user input 954 of pressing the button 852 of the electronic pen 850. In response to the second user input 954, the electronic device 801 may control the thumbnails 924 to rotate (or scroll) in the right or left direction.

Referring to reference numeral 904 in FIG. 9A, while the thumbnail indicator 926 indicates a thumbnail of a second screen 930 corresponding to a second orientation region after the scrolling operation, the electronic device 801 may receive a third user input 956 of touching the hovered time point. In response to the third user input 956, the electronic device 801 may display the second screen 930 through the display 860 at the hovered time point.

FIG. 9B illustrates an operation of displaying thumbnails of screens corresponding to a plurality of orientation regions in a cylindrical shape in an electronic device including a touch circuit according to various embodiments. Referring to reference numeral 906 in FIG. 9B, the electronic device 801 may display thumbnails 944 in the cylindrical shape in response to the first user input 952. According to an embodiment, the electronic device 801 may display the thumbnails 944 in the transparent shape while the first screen 920 is displayed. According to another embodiment, the electronic device 801 may display the thumbnails 944 in the non-transparent shape and the first screen 920 in the transparent shape. According to an embodiment, the electronic device 801 may display a thumbnail indicator 946 (e.g., the thumbnail indicator 316 in FIG. 3) indicating a thumbnail of a screen corresponding to a specific orientation region in the thumbnails 944. Referring to reference numeral 907 in FIG. 9B, the electronic device 801 may control the thumbnails 944 to rotate in the left or right direction in response to the second user input 954 of scrolling the thumbnails 944. Referring to reference numeral 908 in FIG. 9B, while the thumbnail indicator 946 indicates the thumbnail of the screen corresponding to the specific orientation region (e.g., the thumbnail of the second screen 930 in FIG. 9A) after the scrolling operation, the electronic device 801 may receive the third user input 956 of touching hovered time point.

FIG. 9C illustrates an operation of displaying thumbnails of screens corresponding to a plurality of orientation regions in a spherical shape in an electronic device including a touch circuit according to various embodiments. Referring to reference numeral 909 in FIG. 9C, the electronic device 801 may display thumbnails 964 in a spherical shape in response to the first user input 952. According to an embodiment, the electronic device 801 may display the thumbnails 964 in the transparent shape while the first screen 920 is displayed. According to another embodiment, the electronic device 801 may display the thumbnails 964 in the non-transparent shape and the first screen 920 in the transparent shape. According to an embodiment, the electronic device 801 may display a thumbnail indicator 966 (e.g., the thumbnail indicator 316 in FIG. 3) indicating a thumbnail of a screen corresponding to a specific orientation region in the thumbnails 964. Referring to reference numeral 910 in FIG. 9C, the electronic device 801 may control the thumbnails 964 to rotate in the left or right direction in response to the second user input 954 of scrolling the thumbnails 964. According to an embodiment, the electronic device 801 may control the thumbnails 964 in the spherical shape to rotate in an up or down direction as well as in the left or right direction. Referring to reference numeral 911 in FIG. 9C, while the thumbnail indicator 966 indicates the thumbnail of the screen corresponding to the specific orientation region (e.g., the thumbnail of the second screen 930 in FIG. 9A) after the scrolling operation, the electronic device 801 may receive the third user input 956 of touching the hovered time point.

Figure 10:
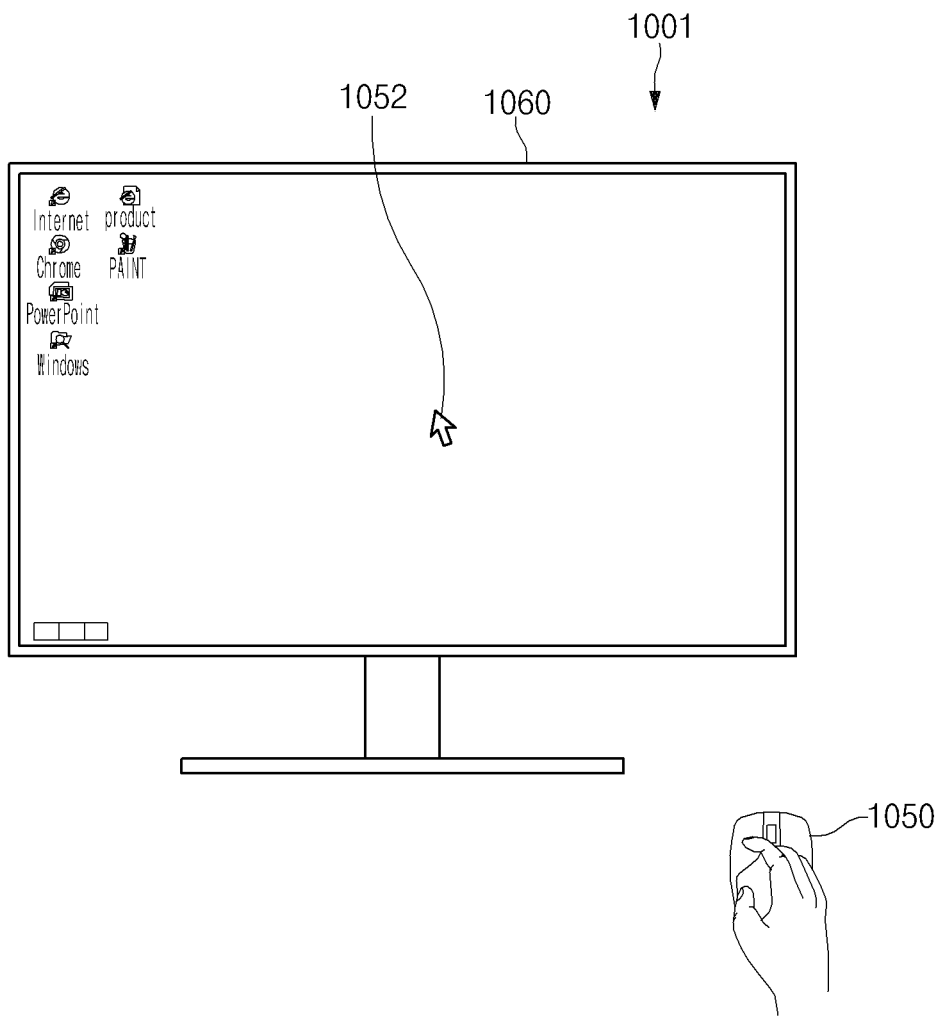
FIG. 10 illustrates an electronic device performing a function of a computer device according to various embodiments.

FIG. 10 illustrates an electronic device performing a function of a computer device according to various embodiments.

Referring to FIG. 10, an electronic device 1001 (e.g., the electronic device 101 in FIG. 1) may include a laptop computer or a desktop computer. The electronic device 1001 may include a display 1060 (e.g., the display device 160 in FIG. 1) and a mouse 1050 (e.g., the input device 150 in FIG. 1). The electronic device 1001 may receive a user input through the mouse 1050. For example, the user input received through the mouse 1050 may include an input of moving the mouse 1050, a wheel scroll input, and a button input. The electronic device 1001 may display a mouse cursor 1052 indicating a point indicated by the mouse through the display 1060. The mouse cursor 1052 may move based on the movement of the mouse 1050.

Figure 11A:
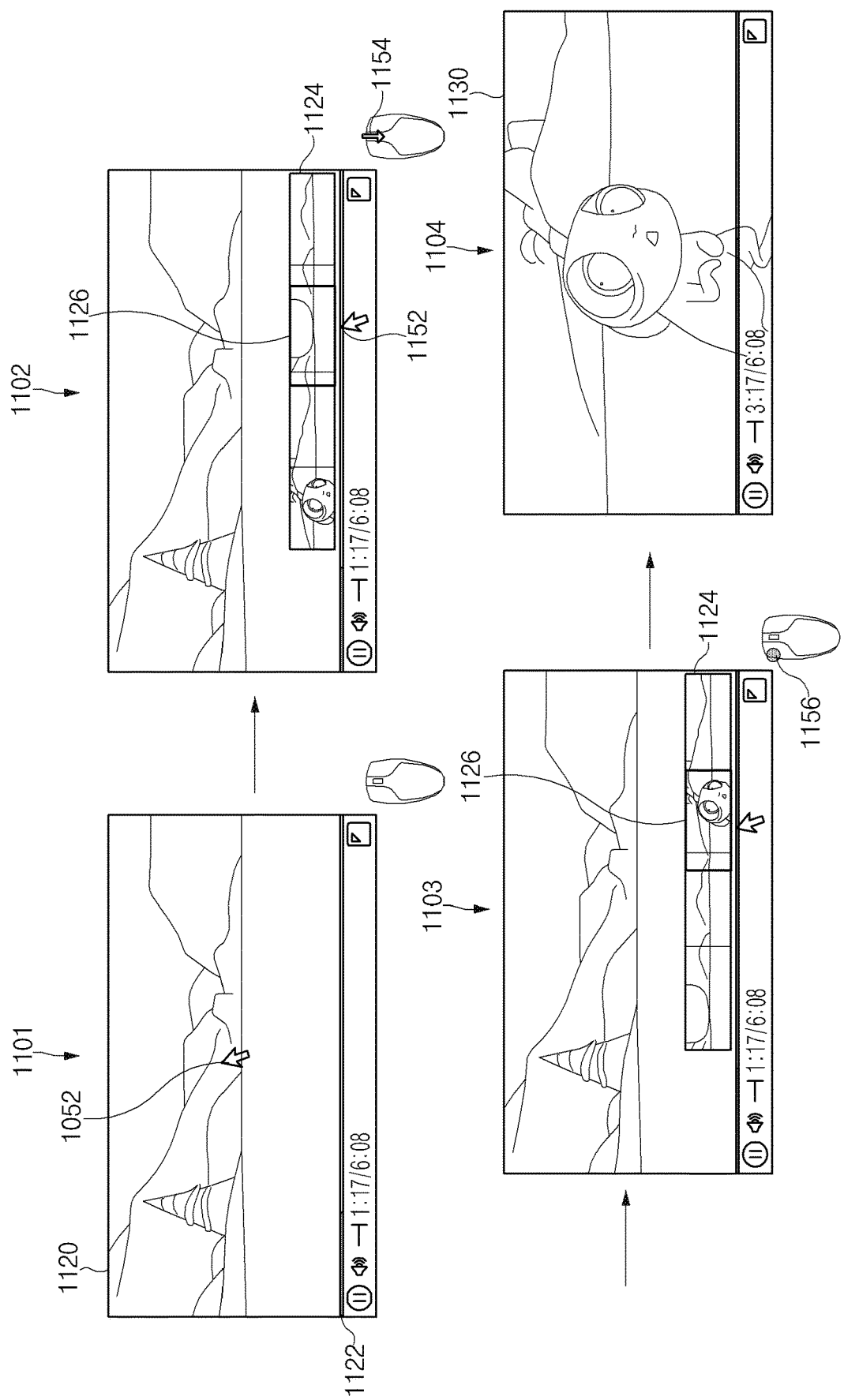
FIG. 11A illustrates an operation of displaying thumbnails of screens corresponding to a plurality of orientation regions in a panorama shape in an electronic device performing a function of a computer device according to various embodiments.
Figure 11B:
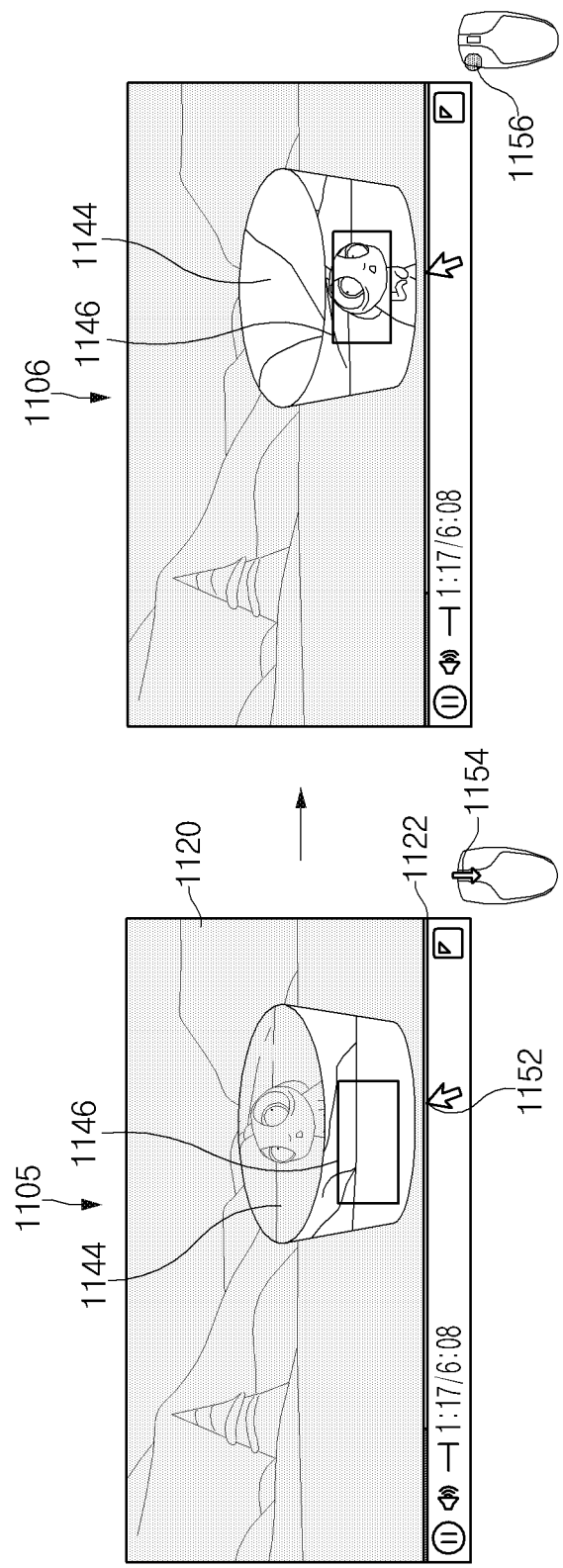
FIG. 11B illustrates an operation of displaying thumbnails of screens corresponding to a plurality of orientation regions in a cylindrical shape in an electronic device performing a function of a computer device according to various embodiments.
Figure 11C:
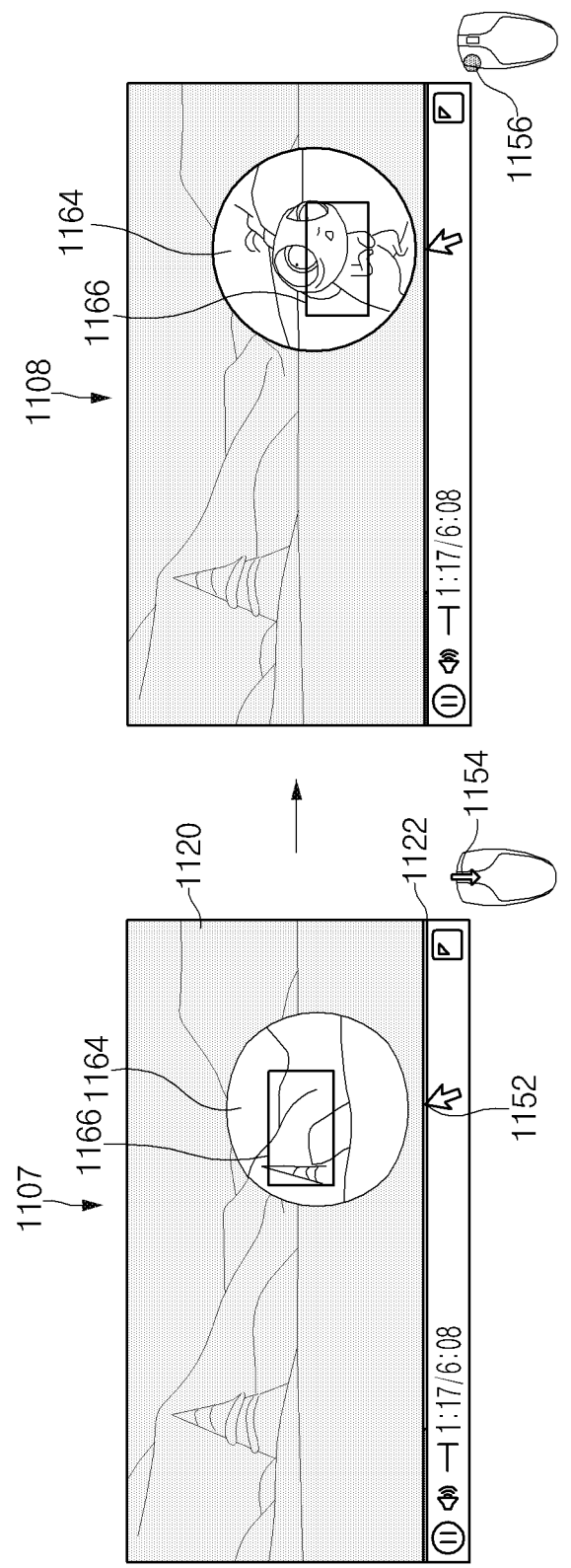
FIG. 11C illustrates an operation of displaying thumbnails of screens corresponding to a plurality of orientation regions in a spherical shape in an electronic device performing a function of a computer device according to various embodiments.

FIGS. 11A to 11C illustrate operations of displaying thumbnails of screens corresponding to a plurality of orientation regions in an electronic device performing a function of a computer device according to various embodiments. Each screen illustrated in each reference numeral in FIGS. 11A to 11C may be displayed by the display 1060 of the electronic device 1001. Embodiments to be described below illustrate an example of a video containing at least one POI, but a similar principle may be applied to an example of moving to a screen of a specific orientation region in the video that does not contain the POI.

FIG. 11A illustrates an operation of displaying thumbnails of screens corresponding to a plurality of orientation regions in a panorama shape in an electronic device performing a function of a computer device according to various embodiments. Referring to reference numeral 1101 in FIG. 11A, when a video supporting a plurality of orientation regions is played, the electronic device 1001 may display a first screen 1120 corresponding to a first orientation region. While the video is being played in the first orientation region, the electronic device 1001 may display a timeline 1122 indicating a playback time of the video.

Referring to reference numeral 1102 in FIG. 11A, the electronic device 1001 may include a first user input 1152 of controlling the mouse 1050 such that the mouse cursor 1052 moves to a specific time point (e.g., a 3 minutes 17 seconds time point of the video) within the timeline 1122. In response to the first user input 1152, the electronic device 1001 may display thumbnails 1124 (e.g., the thumbnails 314 in FIG. 3) of screens corresponding to a plurality of orientation regions at the time point where the mouse cursor 1052 is located through display 1060. The thumbnails 1124 may be in the panoramic shape. According to an embodiment, the electronic device 1001 may display the thumbnails 1124 in the transparent shape while the first screen 1120 is displayed. According to another embodiment, the electronic device 1001 may display the thumbnails 1124 in the non-transparent shape and the first screen 1120 in the transparent shape. According to an embodiment, the electronic device 1001 may display a thumbnail indicator 1126 (e.g., the thumbnail indicator 316 in FIG. 3) indicating a thumbnail of a screen corresponding to a specific orientation region within the thumbnails 1124.

Referring to reference numeral 1103 in FIG. 11A, the electronic device 1001 may receive a second user input 1154 of scrolling a wheel of the mouse 1050 in the up or down direction. The electronic device 1001 may control the thumbnails 1124 to rotate in the left or right direction in response to the second user input 1154.

Referring to reference numeral 1104 in FIG. 11A, while the thumbnail indicator 1126 indicates a thumbnail of a second screen 1130 corresponding to a second orientation region in the thumbnails 1124 after the scrolling operation, the electronic device 1001 may receive a third user input 1156 of clicking a button of the mouse 1050 at the time point at which the mouse cursor 1052 is located. In response to the third user input 1156, the electronic device 1001 may display the second screen 1130 through the display 1060 at the clicked time point (that is, the 3 minutes 17 seconds time point of the video).

FIG. 11B illustrates an operation of displaying thumbnails of screens corresponding to a plurality of orientation regions in a cylindrical shape in an electronic device performing a function of a computer device according to various embodiments. Referring to reference numeral 1105 in FIG. 11B, the electronic device 1001 may display thumbnails 1144 in the cylindrical shape in response to the first user input 1152. According to an embodiment, the electronic device 1001 may display the thumbnail 1144 in the transparent shape while the first screen 1120 is displayed. According to another embodiment, the electronic device 1001 may display the thumbnail 1144 in the non-transparent shape and the first screen 1120 in the transparent shape. According to an embodiment, the electronic device 1001 may display a thumbnail indicator 1146 (e.g., the thumbnail indicator 316 in FIG. 3) for indicating a thumbnail of a screen corresponding to a specific orientation region within the thumbnails 1144. Referring to reference numeral 1106 in FIG. 11B, the electronic device 1001 may control the thumbnails 1144 to rotate in the left or right direction in response to the second user input 1154 of scrolling the thumbnails 1144. While the thumbnail indicator 1146 indicates a thumbnail of a screen corresponding to a specific orientation region (e.g., the thumbnail of the second screen 1130 in FIG. 11A) after the scrolling operation, the electronic device 1001 may receive the third user input 1156 of clicking the button of the mouse 1050.

FIG. 11C illustrates an operation of displaying thumbnails of screens corresponding to a plurality of orientation regions in a spherical shape in an electronic device performing a function of a computer device according to various embodiments. Referring to reference numeral 1107 in FIG. 11C, the electronic device 1001 may display thumbnails 1164 in the spherical shape in response to the first user input 1152. According to an embodiment, the electronic device 1001 may display the thumbnails 1164 in the transparent shape while the first screen 1120 is displayed. According to another embodiment, the electronic device 1001 may display the thumbnails 1164 in the non-transparent shape and the first screen 1120 in the transparent shape. According to an embodiment, the electronic device 1001 may display a thumbnail indicator 1166 (e.g., the thumbnail indicator 316 in FIG. 3) indicating a thumbnail of a screen corresponding to a specific orientation region within the thumbnails 1164. Referring to reference numeral 1108 in FIG. 11C, the electronic device 1001 may control the thumbnails 1164 to rotate in the left or right direction in response to the second user input 1154 of scrolling the thumbnails 1164. According to an embodiment, the electronic device 1001 may control the thumbnails 1164 in the spherical shape to rotate in the up or down direction as well as in the left or right direction. While the thumbnail indicator 1166 indicates the thumbnail of the screen corresponding to the specific orientation region (e.g., the thumbnail of the second screen 1130 in FIG. 11A)

after the scrolling operation, the electronic device 1001 may receive the third user input 1156 of clicking the button of the mouse 1050.

Figure 12A:
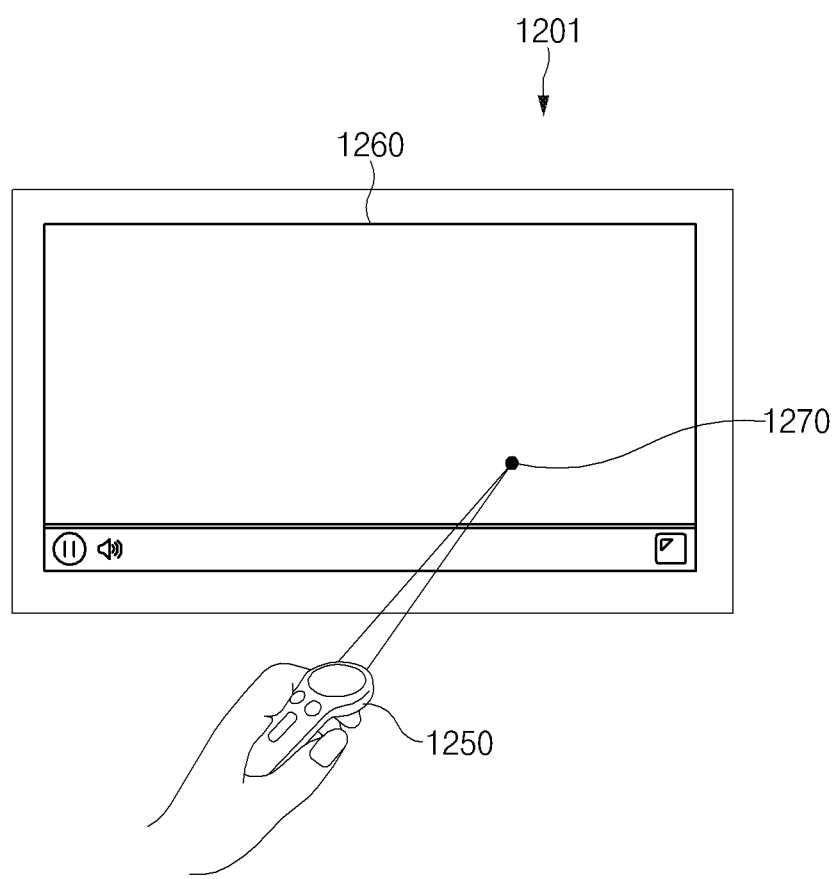
FIG. 12A illustrates an electronic device that supports a virtual reality function according to various embodiments.

FIG. 12A illustrates an electronic device that supports a virtual reality function according to various embodiments.

Referring to FIG. 12A, an electronic device 1201 (e.g., the electronic device 101 in FIG. 1) may support a VR function. The electronic device 1201 may include a display 1260 (e.g., the display device 160 in FIG. 1) and a controller 1250 (e.g., the input device 150 in FIG. 1). The electronic device 1201 may receive a user input through the controller 1250. For example, the user input received through the controller 1250 may include an input of moving the controller 1250, an input of clicking or swiping a touchpad included in the controller 1250, an input of clicking a button included in the controller 1250, or an input of moving a joystick included in the controller. The electronic device 1201 may display a pointer 1270 pointing a point pointed by the controller 1250 through the display 1260. The pointer 1270 may move based on the movement of the controller 1250.

Figure 12B:
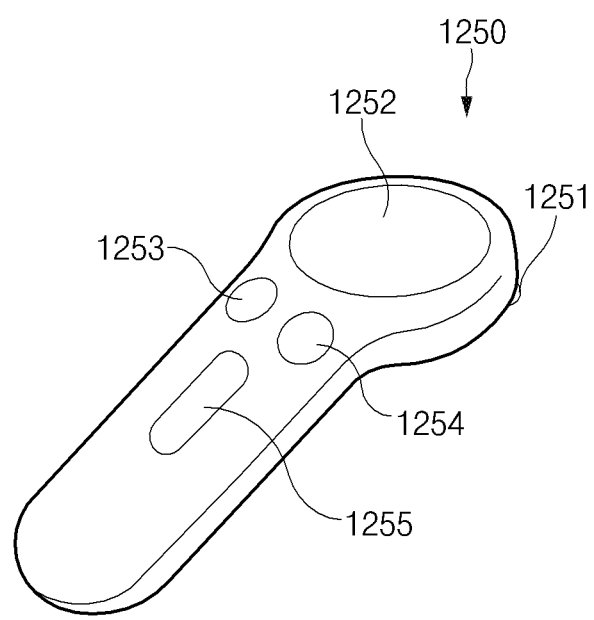
FIG. 12B illustrates a controller that supports a VR function according to various embodiments.

FIG. 12B illustrates a controller that supports a VR function according to various embodiments.

Referring to FIG. 12B, the controller 1250 may include a trigger button 1251, a touchpad 1252, a cancel button 1253, a home button 1254, and a volume button 1255. The configuration of the controller 1250 illustrated in FIG. 12B is merely an example, and changes in the components are possible. For example, the controller 1250 may include a joystick instead of the touchpad 1252 or include the joystick and the touchpad 1252 together. In another example, the controller 1250 may omit at least one of the trigger button 1251, the cancel button 1253, the home button 1254, and the volume button 1255. In another example, the controller 1250 may further include a button other than the buttons illustrated in FIG. 12B. The controller 1250 may receive a swipe input, a touch input, and a click input through the touchpad 1252 and receive a click input through the trigger button 1251. In addition, when a component of the controller 1250 is changed, the electronic device 12010 may receive an input through another button or the joystick.

Figure 13A:
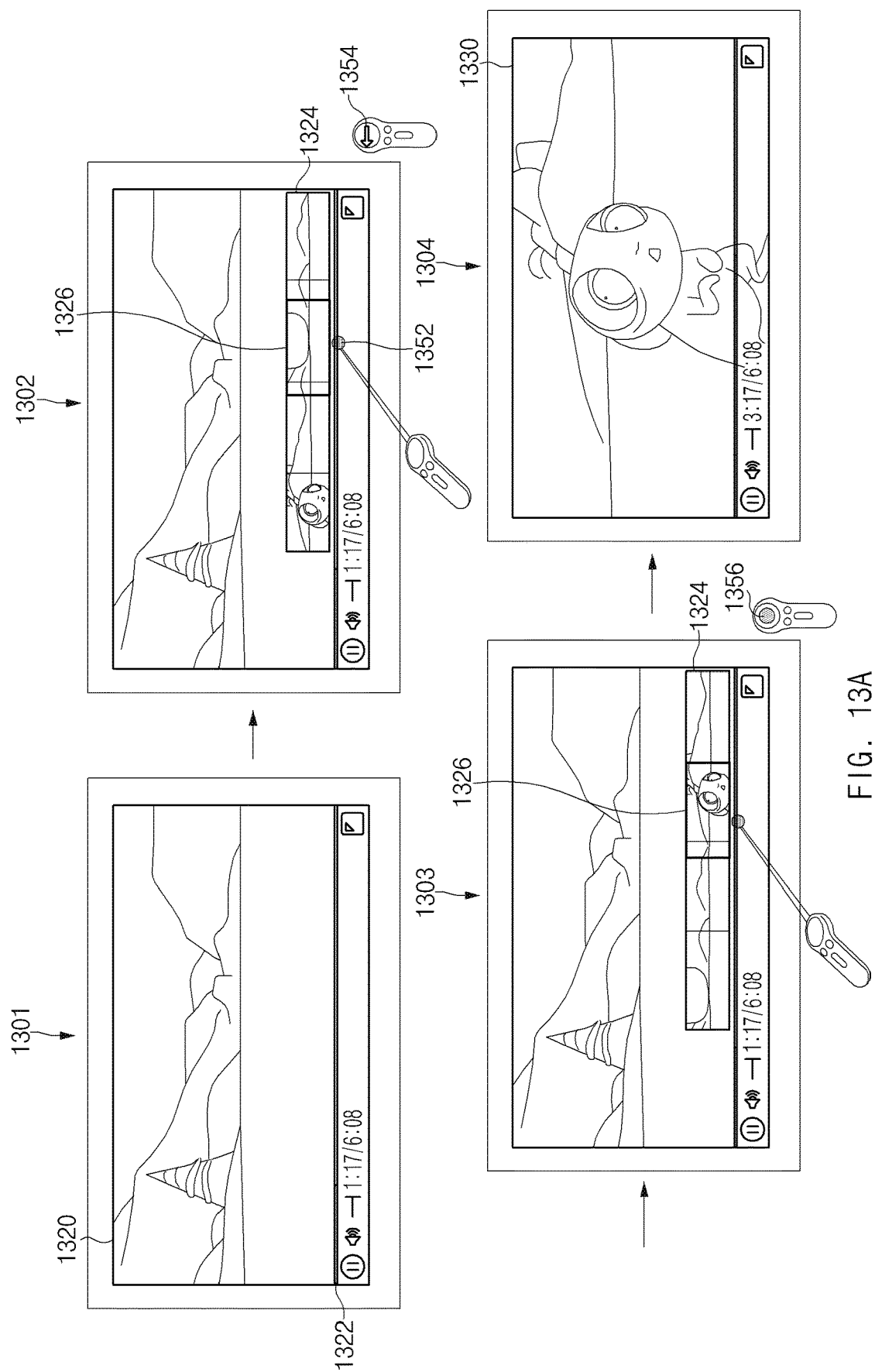
FIG. 13A illustrates an operation of displaying thumbnails of screens corresponding to a plurality of orientation regions in a panorama shape in an electronic device supporting a VR function according to various embodiments.
Figure 13B:
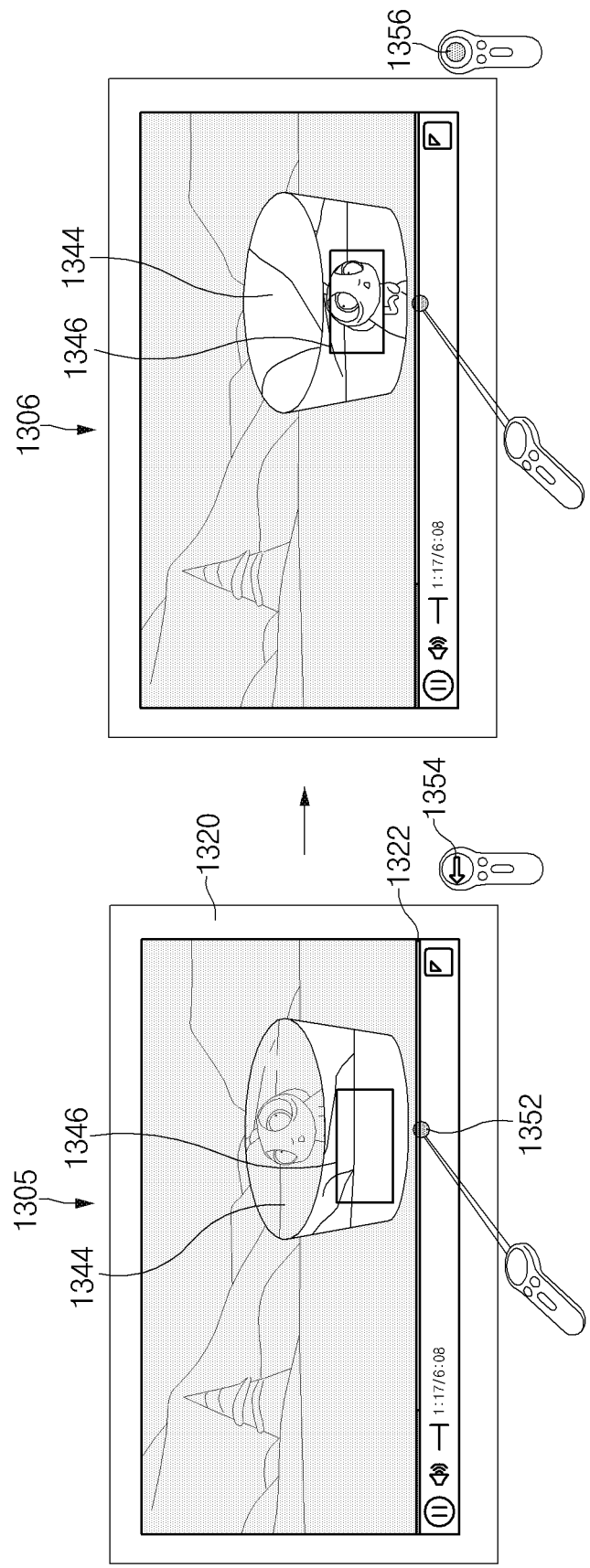
FIG. 13B illustrates an operation of displaying thumbnails of screens corresponding to a plurality of orientation regions in a cylindrical shape in an electronic device supporting a VR function according to various embodiments.
Figure 13C:
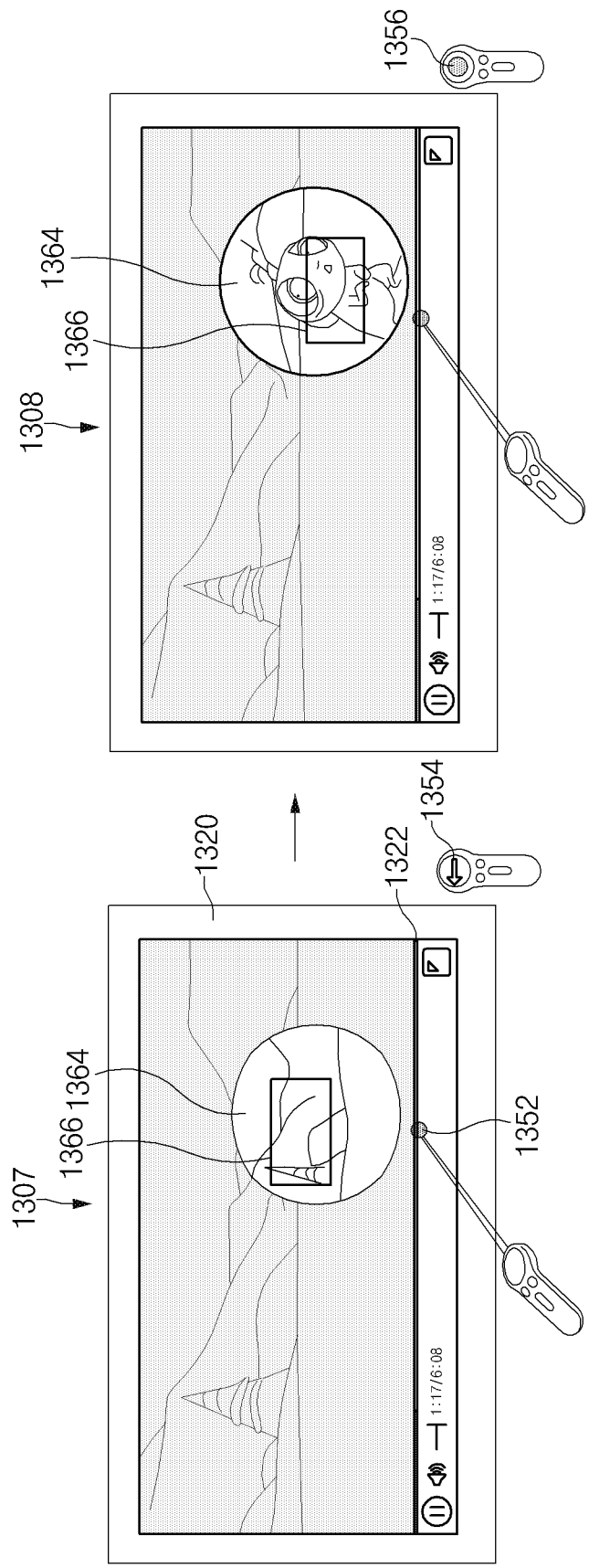
FIG. 13C illustrates an operation of displaying thumbnails of screens corresponding to a plurality of orientation regions in a spherical shape in an electronic device supporting a VR function according to various embodiments.

FIGS. 13A to 13C illustrate operations of displaying thumbnails of screens corresponding to a plurality of orientation regions in an electronic device supporting a VR function according to various embodiments. Each screen illustrated in each reference numeral in FIGS. 13A to 13C may be displayed by the display 1260 of the electronic device 1201. Embodiments to be described below illustrate an example of a video containing at least one POI, but a similar principle may be applied to an example of moving to a screen of a specific orientation region in the video that does not contain the POI.

FIG. 13A illustrates an operation of displaying thumbnails of screens corresponding to a plurality of orientation regions in a panorama shape in an electronic device supporting a VR function according to various embodiments. Referring to reference numeral 1301 in FIG. 13A, the electronic device 1201 may display a first screen 1320 corresponding to a first orientation region (e.g., the first orientation region 271 in FIG. 2B). While the video is being played in the first orientation region, the electronic device 1201 may display a timeline 1322 indicating a playback time of the video.

Referring to reference numeral 1302 in FIG. 13A, the electronic device 1201 may receive a first user input 1352 of moving the controller 1250 such that the pointer 1270 points a specific time point in the timeline 1322. In response to the first user input 1352, the electronic device 1201 may display thumbnails 1324 (e.g., the thumbnails 314 in FIG. 3) of screens corresponding to a plurality of orientation regions at the pointed time point through the display 1260. The thumbnails 1324 may be in a panoramic shape. According to an embodiment, the electronic device 1201 may display the thumbnails 1324 in the transparent shape while the first screen 1320 is displayed. According to another embodiment, the electronic device 1201 may display the thumbnails 1324 in the non-transparent shape and the first screen 1320 in the transparent shape. According to an embodiment, the electronic device 1201 may display a thumbnail indicator 1326 (e.g., the thumbnail indicator 316 in FIG. 3) indicating a thumbnail of a screen corresponding to a specific orientation region in the thumbnails 1324.

Referring to reference numeral 1303 in FIG. 13A, the electronic device 1201 may receive a second user input 1354 of swiping the touchpad 1252 in the left or right direction. In another example, the electronic device 1201 may include the second user input 1354 of swiping the joystick included in the controller 1250 in the left or right direction instead of the touchpad 1252. In another example, the second user input 1354 may include an operation of inputting the button (e.g., the trigger button 1251, the cancel button 1253, the home button 1254, or the volume button 1255) included in the controller 1250. In response to the second user input 1354, the electronic device 1201 may control the thumbnails 1324 to rotate (or scroll) in the right or left direction.

Referring to reference numeral 1304 in FIG. 13A, while the thumbnail indicator 1326 indicates a thumbnail of a second screen 1330 corresponding to a second orientation region after the scrolling operation, the electronic device 1201 may receive a third user input 1356 of clicking the touchpad 1252 (or another button included in the controller 1250) at the pointed time point. In response to the third user input 1356, the electronic device 1201 may display the second screen 1330 at the pointed time point through the display 1260.

FIG. 13B illustrates an operation of displaying thumbnails of screens corresponding to a plurality of orientation regions in a cylindrical shape in an electronic device supporting a VR function according to various embodiments. Referring to reference numeral 1305 in FIG. 13B, the electronic device 1201 may display thumbnails 1344 in the cylindrical shape in response to the first user input 1352. According to an embodiment, the electronic device 1201 may display the thumbnails 1344 in the transparent shape while the first screen 1320 is displayed. According to another embodiment, the electronic device 1201 may display the thumbnails 1344 in the non-transparent shape and the first screen 1320 in the transparent shape. According to an embodiment, the electronic device 1201 may display a thumbnail indicator 1346 (e.g., the thumbnail indicator 316 in FIG. 3) indicating a thumbnail of a screen corresponding to a specific orientation region in the thumbnails 1344. Referring to reference numeral 1306 in FIG. 13B, the electronic device 1201 may control the thumbnails 1344 to rotate in the left or right direction in response to the second user input 1354 of scrolling the thumbnails 1344. According to an embodiment, the electronic device 1201 may scroll the thumbnails 1344 in the up or down direction in response to the input of swiping the touchpad 1252 in the up or down direction. While the thumbnail indicator 1346 indicates the thumbnail of the screen corresponding to the specific orientation region (e.g., the thumbnail of the second screen 1330 in FIG. 13A) after the scrolling operation, the electronic device 1201 may receive the third user input 1356.

FIG. 13C illustrates an operation of displaying thumbnails of screens corresponding to a plurality of orientation regions in a spherical shape in an electronic device supporting a VR function according to various embodiments. Referring to reference numeral 1307 in FIG. 13C, the electronic device 1201 may display thumbnails 1364 in the spherical shape in response to the first user input 1352. According to an embodiment, the electronic device 1201 may display the thumbnails 1364 in the transparent shape while the first screen 1320 is displayed. According to another embodiment, the electronic device 1201 may display the thumbnails 1364 in the non-transparent shape and the first screen 1220 in the transparent shape. According to an embodiment, the electronic device 1201 may display a thumbnail indicator 1366 (e.g., the thumbnail indicator 316 in FIG. 3) indicating a thumbnail of a screen corresponding to a specific orientation region in the thumbnails 1364. Referring to reference numeral 1308 in FIG. 13C, the electronic device 1201 may control the thumbnails 1364 to rotate in the left or right direction in response to the second user input 1354 of scrolling the thumbnails 1364. According to an embodiment, the electronic device 1201 may control the thumbnails 1364 in the spherical shape to rotate in the up or down direction as well as in the left or right direction. For example, the electronic device 1201 may scroll the thumbnails 1364 in the up or down direction in response to the input of swiping the touchpad 1252 in the up or down direction. While the thumbnail indicator 1366 indicates the thumbnail of the screen corresponding to the specific orientation region (e.g., the thumbnail of the second screen 1330 in FIG. 13A) after the scrolling operation, the electronic device 1201 may receive the third user input 1356.

Figure 14:
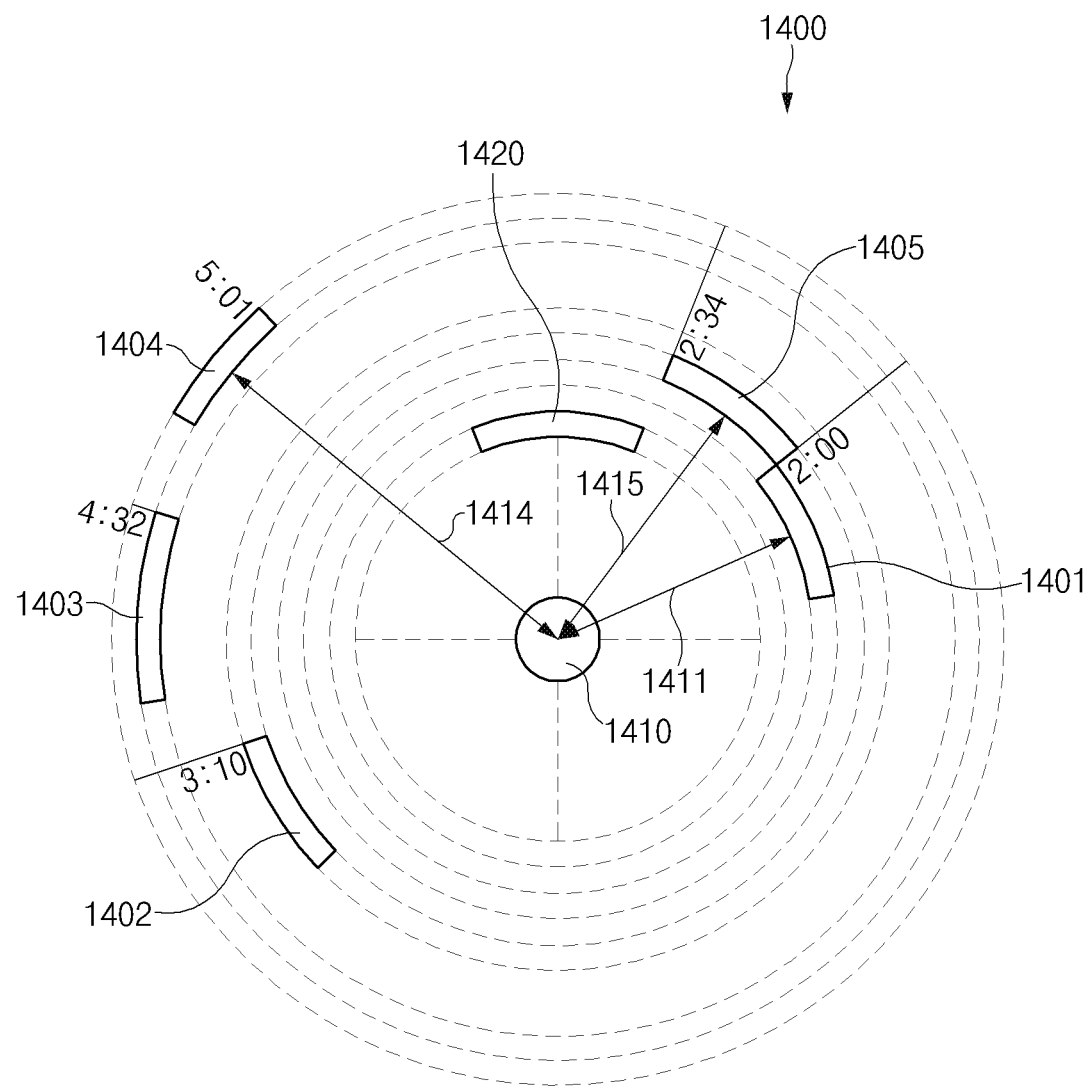
FIG. 14 illustrates a user interface (UI) that shows playback time points and orientation regions of POIs in two dimensions according to various embodiments.

FIG. 14 illustrates a user interface (UI) that shows playback time points and orientation regions of POIs in two dimensions according to various embodiments.

Referring to FIG. 14, a UI 1400 may represent a VR environment of a 360 video viewed by a user 1410 of the electronic device 101 in two dimensions. When the 360 video is played, the electronic device 101 may display the UI 1400 in a screen 1420 (e.g., the first screen 310 in FIG. 3) displayed through the display. The electronic device 101 may display each of a first screen 1401, a second screen 1402, a third screen 1403, a fourth screen 1404, and a fifth screen 1405 containing a POI within the 360 video in the UI 1400 based on an orientation region and a playback time point thereof in addition to the screen 1420 currently being displayed to the user. A distance between each screen and the user 1410 may be proportional to the playback time point of the 360 video of each screen. For example, a playback time point (that is, 2 minutes 00 seconds) of the first screen 1401 is ahead of a playback time point (that is, 2 minutes 34 seconds) of the fifth screen 1405 containing another POI, so that a first distance 1411 between the first screen 1401 and the user 1410 in the UI 1400 may be smaller than a fifth distance 1415 between the fifth screen 1405 and the user 1410.

The electronic device 101 may use the UI 1400 to provide information about a playback time point and an orientation region of another screen containing a POI to the user even while a specific screen (e.g., the screen 1420) is displayed.

Figure 15:
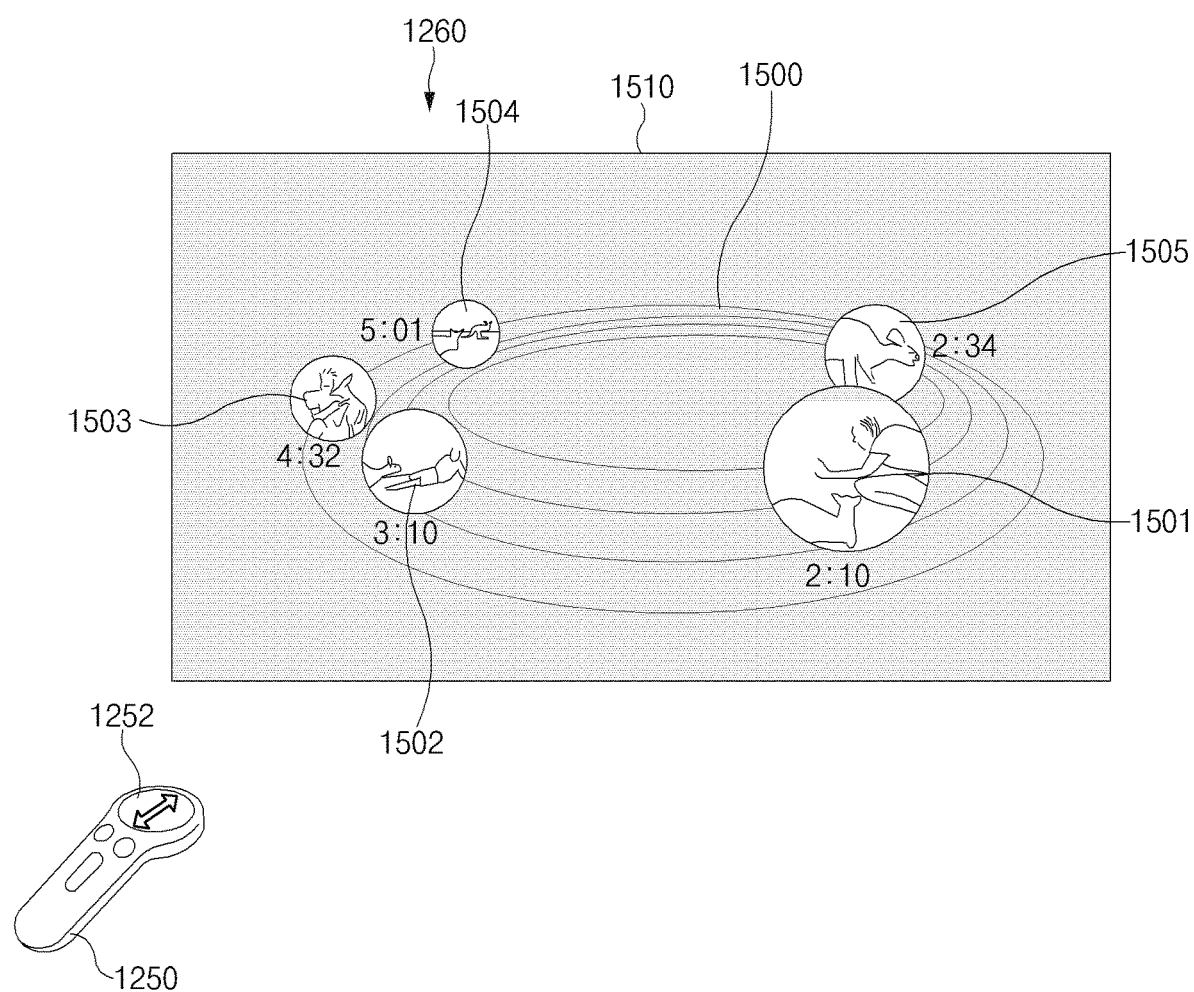
FIG. 15 illustrates a UI that represents playback time points and orientation regions of POIs in an electronic device supporting a VR function according to various embodiments.

FIG. 15 illustrates a UI that represents playback time points and orientation regions of POIs in an electronic device supporting a VR function according to various embodiments.

Referring to FIG. 15, a UI 1500 may be displayed by the display 1260 of the electronic device 1201 (or the electronic device 101). The UI 1500 may be the UI 1400 in FIG. 14 changed into a three-dimensional shape. According to an embodiment, the UI 1500 may have a circular, a square, a cylindrical, or a spherical shape. When the 360 video is played, the electronic device 1201 may display a screen 1510 corresponding to a first orientation region (e.g., the first orientation region 221 in FIG. 2). The electronic device 1201 may display the UI 1500 in response to a user input. According to an embodiment, while the UI 1500 is displayed, the screen 1510 may be displayed in a dark shape or the transparent shape.

According to an embodiment, the electronic device 1201 may display each thumbnail of each screen containing a POI in the 360 video in the UI 1500 based on an orientation region and a playback time point of each corresponding screen. The UI 1500 may include a first thumbnail 1501, a second thumbnail 1502, a third thumbnail 1503, a fourth thumbnail 1504, and a fifth thumbnail 1505. The electronic device 1201 may control the UI 1500 to rotate in response to the input of scrolling the touchpad 1252 of the controller 1250 (in the left or right direction or in the up and down direction). When the electronic device 1201 receives a user input of selecting one thumbnail in the UI 1500 through the controller 1250, the electronic device 1201 may display a selected screen through the display 1260.

Figure 16:
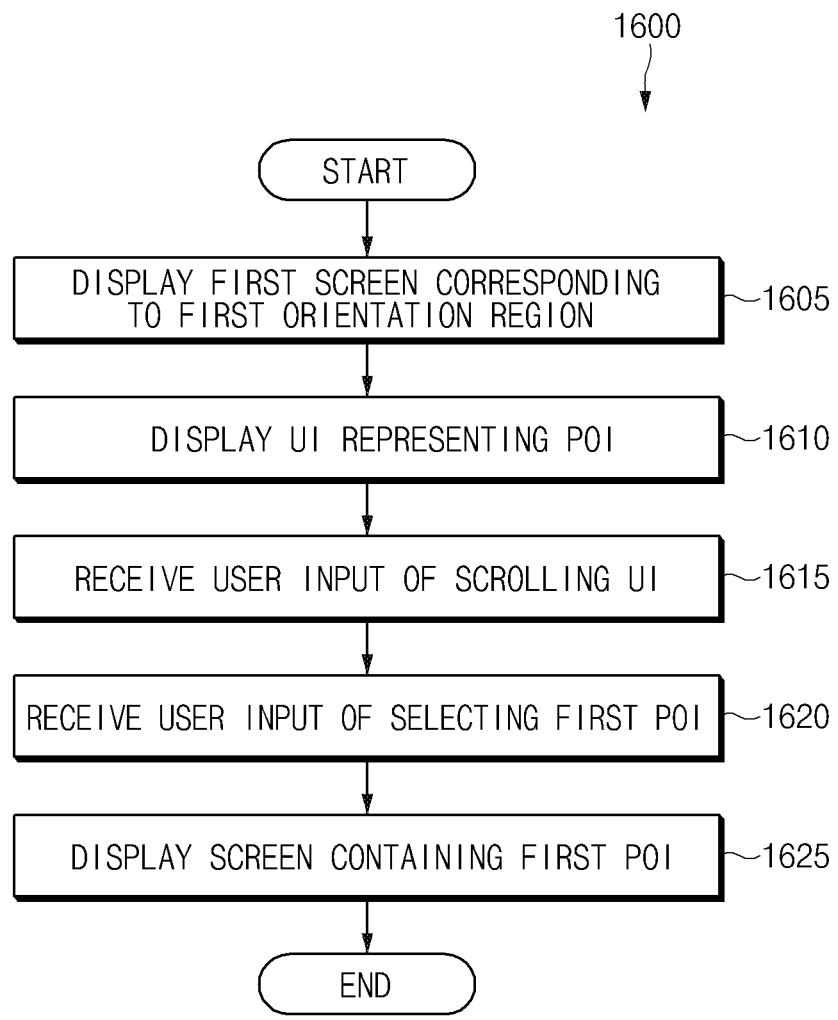
FIG. 16 illustrates an operation flowchart of an electronic device displaying a UI that represents playback time points and orientation regions of POIs according to various embodiments.

FIG. 16 illustrates an operation flowchart of an electronic device displaying a UI that represents playback time points and orientation regions of POIs according to various embodiments. Operations to be described below may be implemented by the electronic device 101 (or the electronic device 1201). Further, when the instructions included in the memory 130 are executed by the processor 120, the instructions may cause the processor to implement the operations to be described below.

Referring to FIG. 16, in operation 1605 of a method 1600, the processor 120 may display the first screen 1510 corresponding to the first orientation region (e.g., the first orientation region 271 in FIG. 2) among the plurality of orientation regions.

In operation 1610, while the first screen 1510 is displayed, the processor 120 may display a UI (e.g., the UI 1400 in FIG. 14 or the UI 1500 in FIG. 15) representing at least one POI. According to an embodiment, the UI may be displayed in the circular shape. According to an embodiment, the processor 120 may display the UI so as to overlap the first screen 1510, or display the UI in a region of the first screen 1510.

In operation 1615, the processor 120 may receive a user input of scrolling the UI. When the electronic device 101 supports the VR function, the user input of scrolling the UI may include an input of swiping the touchpad of the controller, the button input of the controller, or the input of moving the joystick of the controller. When the display of the electronic device 101 includes the touch circuit, the user input of scrolling the UI may include the button input of the electronic pen. When the electronic device 101 performs the function of the computer device, the user input of scrolling the UI may include the input of scrolling the wheel of the mouse.

In operation 1620, the processor 120 may receive a user input of selecting a first POI among the plurality of POIs. When the display of the electronic device 101 includes the touch circuit, the user input of selecting the first POI may include a touch input of the electronic pen. When the electronic device 101 performs the function of the computer device, the user input of selecting the first POI may include the input of clicking the button of the mouse. When the electronic device 101 supports the VR function, the user input of selecting the first POI may include the input for clicking the touchpad or the button of the controller.

In operation 1625, the processor 120 may display a screen containing the first POI through the display. Through the above-described method 1600, the electronic device 101 may provide information of the POI not displayed to the user through the display.

As described above, an electronic device (e.g., the electronic device 101 in FIG. 1) includes a display (e.g., the display device 160 in FIG. 1), a processor (e.g., the processor 120 in FIG. 1) electrically connected to the display, and a memory (e.g., the memory 130 in FIG. 1) electrically connected to the processor, wherein the memory stores instructions that, when executed by the processor, cause the processor to display, when a video supporting a plurality of orientation regions is played, a first screen corresponding to a first orientation region among the plurality of orientation regions through the display, display a timeline representing a playback time of the video through the display, receive a first user input pointing a first time point in the timeline, display thumbnails of screens corresponding to the plurality of orientation regions through the display at the first time point in response to the first user input, and receive a second user input of scrolling the thumbnails. According to an embodiment, the thumbnails may contain at least one POI.

According to an embodiment, the instructions, when executed by the processor, may cause the processor to receive a third user input of selecting a thumbnail of a second screen corresponding to a second orientation region among the thumbnails, and display the second screen at the first time point through the display in response to the third user input.

According to an embodiment, the instructions, when executed by the processor, may cause the processor to determine whether the second screen contains a POI, and display an indicator indicating a direction of a third screen containing the POI through the display while the second screen is displayed when the second screen does not contain the POI.

According to an embodiment, the instructions, when executed by the processor, may cause the processor to display a thumbnail of a third screen containing a POI through the display while the second screen is displayed when the second screen does not contain the POI.

According to an embodiment, the instructions, when executed by the processor, may cause the processor to display the thumbnails above the timeline through the display.

According to an embodiment, the thumbnails may be formed in one of a panoramic shape, a spherical shape, and a cylindrical shape.

According to an embodiment, the display may include a touch circuit, wherein the first user input may include a hovering input of an electronic pen connected to the electronic device, and wherein the second user input may include a button input of the electronic pen.

As described above, a method (the method 400 in FIG. 4) of an electronic device includes displaying, when a video supporting a plurality of orientation regions is played, a first screen corresponding to a first orientation region among the plurality of orientation regions through a display, displaying a timeline representing a playback time of the video through the display, receiving a first user input pointing a first time point in the timeline, displaying thumbnails of screens corresponding to the plurality of orientation regions through the display at the first time point in response to the first user input, receiving a second user input of scrolling the thumbnails, receiving a third user input of selecting a thumbnail of a second screen corresponding to a second orientation region among the thumbnails, and displaying the second screen at the first time point through the display in response to the third user input. According to an embodiment, the thumbnails may contain at least one POI.

According to an embodiment, the method may further include determining whether the second screen contains the POI in response to the third user input.

According to an embodiment, the method may further include displaying an indicator indicating a direction of a third screen containing the POI through the display while the second screen is displayed when the second screen does not contain the POI.

According to an embodiment, the method may further include displaying a thumbnail of a third screen containing the POI through the display while the second screen is displayed when the second screen does not contain the POI.

According to an embodiment, wherein the display may include a touch circuit, wherein the first user input may include a hovering input of an electronic pen connected to the electronic device, and wherein the second user input may include a button input of the electronic pen.

As described above, an electronic device (e.g., the electronic device 101 in FIG. 1) includes a display (e.g., the display device 160 in FIG. 1), a processor (e.g., the processor 120 in FIG. 1) electrically connected to the display, and a memory (e.g., the memory 130 in FIG. 1) electrically connected to the processor, wherein the memory stores instructions that, when executed by the processor, cause the processor to display, when a video supporting a plurality of orientation regions is played, a first screen corresponding to a first orientation region among the plurality of orientation regions through the display, display a user interface representing at least one POI while the first screen is displayed through the display, wherein the UI includes a playback time point and an orientation region of each of the at least one POI, receive a first user input of scrolling the UI, receive a second user input of selecting a first POI among the at least one POI, and display a screen containing the first POI through the display in response to the second user input.

According to an embodiment, wherein the UI may be formed in a circular shape, a cylindrical shape, and a spherical shape, and the instructions, when executed by the processor, may cause the processor to determine a location of each of the at least one POI displayed in the UI based on the playback time point and orientation region of each of the at least one POI.

According to an embodiment, the instructions, when executed by the processor, may cause the processor to display the UI to overlap the first screen.

According to an embodiment, the display may include a touch circuit, and wherein the first user input may include a button input of an electronic pen connected to the electronic device.

According to an embodiment, the first user input may include one of a swipe input of a touchpad of a controller connected to the electronic device, a button input of the controller, or an input of moving a joystick of the controller.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a display;
a processor electrically connected to the display; and
a memory electrically connected to the processor,
wherein the memory stores instructions that, when executed by the processor, cause the processor to:
display, when a video supporting a plurality of orientation regions of 360 degrees is played, a first screen corresponding to a first orientation region among the plurality of orientation regions through the display;
display a user interface including a plurality of circles corresponding to a playback time while the first screen is displayed through the display;
display, on the plurality of circles, a position of at least one screen containing at least one of point of interest (POI) included in the video, while the first screen is displayed through the display;
display a timeline representing the playback time of the video through the display;
receive a first user input pointing a first time point in the timeline;
display thumbnails of screens corresponding to the plurality of orientation regions through the display at the first time point in response to the first user input in a state in which the first screen corresponding to the first orientation region is displayed through the display while the video is playing;
receive a second user input selecting a thumbnail among the thumbnails;
display a second screen at the first time point corresponding to the selected thumbnail through the display, in response to the second user input;
determine whether the second screen at the first time point contains a POI;
based on the second screen at the first time point not containing any POI, display an indicator indicating a direction of a third screen at the first time point containing the POI through the display, while the second screen is displayed;
receive a third input selecting the indicator; and
display the third screen at the first time point containing the POI through the display.

2. The electronic device of claim 1, wherein the instructions, when executed by the processor, further cause the processor to:
  display the thumbnails above the timeline through the display.

3. The electronic device of claim 1, wherein the thumbnails are formed in one of a panoramic shape, a spherical shape, and a cylindrical shape.

4. The electronic device of claim 1,
  wherein the display includes a touch circuit,
  wherein the first user input includes a hovering input of an electronic pen connected to the electronic device, and
  wherein the second user input includes a button input of the electronic pen.

5. A method of an electronic device, the method comprising:
  displaying, when a video supporting a plurality of orientation regions of 360 degrees is played, a first screen corresponding to a first orientation region among the plurality of orientation regions through a display;
  displaying a user interface including a plurality of circles corresponding to a playback time while the first screen is displayed through the display;
  displaying, on the plurality of circles, a position of screen containing at least one of point of interest (POI) included in the video, while the first screen is displayed through the display;
  displaying a timeline representing the playback time of the video through the display;
  receiving a first user input pointing a first time point in the timeline;
  displaying thumbnails of screens corresponding to the plurality of orientation regions through the display at the first time point in response to the first user input in a state in which the first screen corresponding to the first orientation region is displayed through the display while the video is playing;
  receiving a second user input selecting a thumbnail among the thumbnails;
  displaying a second screen at the first time point corresponding to the selected thumbnail through the display, in response to the second user input;
  determining whether the second screen at the first time point contains a POI;
  based on the second screen at the first time point not containing any POI, displaying an indicator indicating a direction of a third screen at the first time point containing the POI through the display, while the second screen is displayed;
  receiving a third input selecting the indicator; and
  displaying the third screen at the first time point containing the POI through the display.

6. The method of claim 5, wherein the thumbnails are formed in one of a panoramic shape, a spherical shape, and a cylindrical shape.

7. The method of claim 5,
  wherein the display includes a touch circuit,
  wherein the first user input includes a hovering input of an electronic pen connected to the electronic device, and
  wherein the second user input includes a button input of the electronic pen.

\* \* \* \* \*